(12) United States Patent
Ramsey et al.

(10) Patent No.: US 7,674,517 B2
(45) Date of Patent: Mar. 9, 2010

(54) COMPOSITE POROUS MATERIALS AND METHODS OF MAKING AND USING THE SAME

(75) Inventors: Thomas H. Ramsey, Peachtree City, GA (US); Jerry Dean Raney, Smyrna, GA (US); Jacob Shorr, Lexington, MA (US); Guoqiang Mao, Smyrna, GA (US)

(73) Assignee: Porex Corporation, Fairburn, GA (US)

( * ) Notice: Subject to any disclaimer, the term of this patent is extended or adjusted under 35 U.S.C. 154(b) by 419 days.

(21) Appl. No.: 10/982,392

(22) Filed: Nov. 4, 2004

(65) Prior Publication Data

US 2005/0170159 A1 Aug. 4, 2005

Related U.S. Application Data

(60) Provisional application No. 60/516,753, filed on Nov. 4, 2003.

(51) Int. Cl.
*B32B 7/02* (2006.01)
(52) U.S. Cl. .................. 428/212; 428/304.4; 428/306.6; 428/308.4; 428/315.5; 428/315.7; 428/316.6
(58) Field of Classification Search ................ 428/212, 428/304.4, 306.6, 308.4, 315.5, 315.7, 316.6
See application file for complete search history.

(56) References Cited

U.S. PATENT DOCUMENTS

| 3,591,010 | A | 7/1971 | Pall et al. ................... 210/493 |
| 4,177,228 | A | 12/1979 | Prolss |
| 4,222,874 | A | 9/1980 | Connelly |
| 4,761,232 | A | 8/1988 | Bright |
| 4,824,568 | A | 4/1989 | Allegrezza, Jr. et al. ..... 210/490 |
| 4,828,772 | A | 5/1989 | Lopatin et al. ............. 264/45.9 |
| 5,094,895 | A * | 3/1992 | Branca et al. ............ 428/36.91 |
| 5,232,601 | A | 8/1993 | Chu et al. |
| 5,514,413 | A | 5/1996 | Van't Hof et al. |
| 5,547,481 | A | 8/1996 | Herding et al. |
| 5,804,074 | A * | 9/1998 | Takiguchi et al. ...... 210/497.01 |
| 5,919,370 | A | 7/1999 | Rottger et al. |

(Continued)

FOREIGN PATENT DOCUMENTS

EP 0 596 411 A2 5/1994

(Continued)

OTHER PUBLICATIONS

Billmeyer, Jr., *Textbook of Polymer Science* (Wiley-Interscience, 2nd ed.), 1971:xiii, 438-439, 452-457.

(Continued)

*Primary Examiner*—Bruce H Hess
*Assistant Examiner*—David J Joy
(74) *Attorney, Agent, or Firm*—John K. McDonald; J. Clinton Wimbish; Kilpatrick Stockton LLP

(57) ABSTRACT

The invention provides composite porous materials in which a second material is fused to and/or is in the pores and/or is fused directly to some of the pore walls of a porous first material. The invention also provides methods of filtering a fluid using these composite porous materials and methods of manufacturing the composite porous materials.

24 Claims, 12 Drawing Sheets

U.S. PATENT DOCUMENTS

| | | | |
|---|---|---|---|
| 6,143,675 A * | 11/2000 | McCollam et al. | 442/221 |
| 6,258,196 B1 * | 7/2001 | Suzuki et al. | 156/176 |
| 6,270,671 B1 | 8/2001 | Shorr et al. | |
| 6,596,112 B1 | 7/2003 | Ditter et al. | |
| 2002/0045041 A1 * | 4/2002 | Dillon et al. | 428/311.51 |
| 2003/0113528 A1 * | 6/2003 | Moya | 428/304.4 |
| 2004/0238440 A1 | 12/2004 | Clendenning et al. | |
| 2008/0149571 A1 * | 6/2008 | Zeller et al. | 210/767 |

FOREIGN PATENT DOCUMENTS

| | | |
|---|---|---|
| EP | 1 063 256 | 12/2000 |
| WO | WO-9918282 A1 | 4/1999 |
| WO | WO 99/47246 A | 9/1999 |
| WO | WO00/53294 | 9/2000 |
| WO | WO 2004/092076 A | 10/2004 |
| WO | WO 2005/047857 | 5/2005 |

OTHER PUBLICATIONS

*Kirk-Othmer Encyc. of Chem. Technol.* Index to vols. 1-25 and Supplement (Wiley-Interscience, 4$^{th}$ ed.), 1998:372, 686-704 and 931.

Mulder, *Basic Principles of Membrane Technology*, Kluwer Academic Publishers, Dordrecht, 1996:12-14.

International Search Report for International Patent Application No. PCT/USO4/37088 issued on Jul. 9, 2005.

Supplementary Partial European Search Report.

PCT/US04/037086 International Search Report dated Jul. 20, 2005.

EP048008445 Supplemental Partial European Search Report dated Nov. 30, 2006.

PCT/US2007/011252 International Search Report and Written Opinion dated Dec. 3, 2007.

EP077769370 Office Action dated Jun. 30, 2008.

EP077769370 Response to Office Action dated Nov. 6, 2008.

EP077769370 Office Action dated Dec. 5, 2008.

EP048008445 Office Action dated Dec. 9, 2008.

EP048008445 Response to Office Action dated Apr. 3, 2009.

EP077769370 Response to Office Action dated Apr. 15, 2009.

EP077769370 Communication under Rule 71(3) EPC dated May 18, 2009.

Office Action mailed on Jun. 24, 2009 in U.S. Appl. No. 11/801,152.

* cited by examiner

COMPOSITE POROUS MATERIALS AND METHODS OF MAKING AND USING THE SAME

This application claims the benefit of U.S. provisional application 60/516,753, filed Nov. 4, 2003, the disclosure of the provisional application being incorporated by reference herein in its entirety.

FIELD OF THE INVENTION

The invention relates to composite porous materials and methods of making and using the same.

BACKGROUND OF THE INVENTION

Porous membranes have long been used to filter fine solids from fluids. Microfiltration, ultrafiltration, nanofiltration, and reverse osmosis ("RO") are examples of processes based on the use of porous membranes. Applications in which these processes are employed include purifying salt water to produce drinking water, filtering wastewater for reuse as industrial process water, and removing unwanted solids from certain beverages such as beer and wine.

Microfiltration processes are generally used in applications in which it is desired to remove relatively large molecules from a fluid stream. Microfiltration generally operates at lower pressures than ultrafiltration and RO. Applications suited for microfiltration include, but are not limited to, waste water treatment, oil-water separation, and dust collection.

Ultrafiltration is a pressure-driven membrane process capable of separating solution components on the basis of molecular size and shape. Under an applied pressure difference across an ultrafiltration membrane, solvent and small solute species pass through the membrane while larger solute species are retained by the membrane. Typical applications for ultrafiltration include pretreatment of sea water in desalinization plants and treatment of wastewater for reuse as process water.

Reverse osmosis has found widespread use in filtration applications which require filtration of very fine solids, including dissolved ions. For example, in regions of the world with limited sources of fresh water, RO has been successfully used to purify sea water. Typically, each RO membrane in the apparatus is positioned within a tubular, outer, pressure vessel adapted to withstand the higher pressures associated with the RO process. The porous membrane used in the RO process is often bonded to or coated on a porous drainage layer to form a sandwich-like structure. Three of the four sides of this "RO membrane sandwich" are sealed. The fourth side of the sandwich is fed into a slot in a core and spirally wrapped around such core to achieve the desired surface area. The membrane of the RO sandwich is generally made from a material different from the material of the drainage layer.

In most cases, the porous membrane used in the aforementioned filtration processes is attached to a porous substrate. Such porous substrates may be very thin (e.g., from 15 µm to 95 µm in thickness) and, therefore, fragile and unable to provide structural support. See, e.g., Examples 1-3 and 9 of U.S. Pat. No. 4,828,772 to Lopatin et al. If the porous substrate is able to provide a mechanical support for the membrane used in the aforementioned filtration processes (thereby making the membrane more suitable for applications requiring, e.g., higher pressure), the substrate is made of a different material than the material from which the membrane is made. In general, the membrane and substrate are layered, or the membrane is anchored to the substrate. There is no bond between the membrane and substrate and there is a distinguishable interface between the membrane and substrate.

Some membranes used in ultrafiltration process are composite membranes. Composite membranes have reportedly been made using glycerin sandwiched between an ultrafiltration membrane and a microfiltration membrane substrate, each of which can be made from the same polymer. The glycerin acts to reduce the effect of the ultrafiltration membrane solution on the microfiltration membrane. See e.g., U.S. Pat. No. 4,824,568 to Allegrezza, Jr. et al. and published European Patent Application Number 0596411 A2 of Millipore Corp. These references disclose introducing glycerin and/or using a nonsolvent for the microfiltration membrane (which is on the order of 125 micrometers (µm) thick) when applying an ultrafiltration membrane solution to prevent etching and/or dissolving of the microfiltration membrane substrate by the ultrafiltration membrane solution and avoid fusing of the formed ultrafiltration membrane to the microfiltration membrane substrate, even if the membrane and the substrate are made from the same polymer.

The casting of a membrane made of one material on a substrate made of another material can yield materials poorly suited for many applications, especially when the membrane material and substrate materials have different solubility in the casting solvent and different thermal properties. For instance, the membrane surfaces of such dissimilar materials are sometimes not uniform. This lack of uniformity diminishes the strength with which the membrane is adhered to the substrate, and can lead to wide pore size distribution, leading to the uneven flow of liquids through the membrane, and unpredictable performance properties.

Another design consideration is that the different materials used as membrane and substrate exhibit different chemical and thermal properties. Therefore, the two different materials (e.g., two different polymers) generally have poor adhesion and significant voids at the interface between the membrane and substrate. This may be due, in part, to poor miscibility of the two different materials. Poor adhesion can also be due to differing thermal properties of the materials, which can lead to tension at their interface, causing delamination and surface cracking. The vulnerability of the existing membrane-substrate systems to delamination is exacerbated by the pressures used in filtration processes (high pressure is favored for increasing the flux during separations). Delamination in existing two-material, membrane-substrate systems is also caused by the frequent application of pressure used to backflush or backwash the system. Indeed, backflushing is one of the major causes of delamination in two-material, membrane-substrate systems used in microfiltration and ultrafiltration. Thus, it is desirable to provide materials that have strong adhesion between the membrane and substrate which can be used in a variety of filtration applications.

Additionally, there remain unmet needs for a porous membrane which can be steam-sterilized (existing membranes containing polyethylene cannot be steam-sterilized) and has greater backpressure resistance (which provides for better cleaning and extended membrane life).

Existing manufacturing methods for making membrane-coated tubular substrates can involve completely filling the bore of a vertically-oriented tube with a solution of the membrane material, allowing a weighted device inserted into the top of the interior to slowly sink to the bottom of the vertical tube and, as it does so, extruding the membrane solution through the porous surfaces or walls of the tube, and cleaning the outside of the tube with a ring-shaped device slightly larger then the outer diameter of the tube by sliding the ring-shaped device from top to bottom of the tube. Such methods are not optimal because, for example, they are time consuming, costly, and may result in a non-uniform membrane coating and an uneven depth of membrane penetration into the substrate tube.

SUMMARY OF THE INVENTION

The present invention relates, in part, to composite porous materials in which a first material has pores of a relatively large average pore size, at least some of which pores have therein a second material having pores of a relatively small average pore size. In a specific embodiment of the present invention, the second material coats at least part of a surface of the first material. In another specific embodiment of the present invention, at least a portion of the second material is fused to the first material. In another specific embodiment, the second material is in some of the pores of the first material. In another specific embodiment, the second material in the pores of the first material is fused directly to at least some of the pore walls of the first material. In other embodiments, the first and second materials each comprise polymers soluble in a common solvent.

The present invention also relates to composite porous materials comprising a porous polymer microfiltration, ultrafiltration, or nanofiltration membrane fused to a sintered, porous polymer substrate with a large average pore size, in which the porous membrane and the porous substrate are comprised of polymers soluble in a common solvent.

The present invention also relates to methods of making the composite porous materials described herein, in particular, to an applicator apparatus for facilitating the same.

The present invention also relates to methods of using the composite porous materials described herein.

BRIEF DESCRIPTION OF THE FIGURES

Specific aspects of the present invention can be understood with reference to the attached figures, in which.

DETAILED DESCRIPTION OF THE INVENTION

Figure 1:
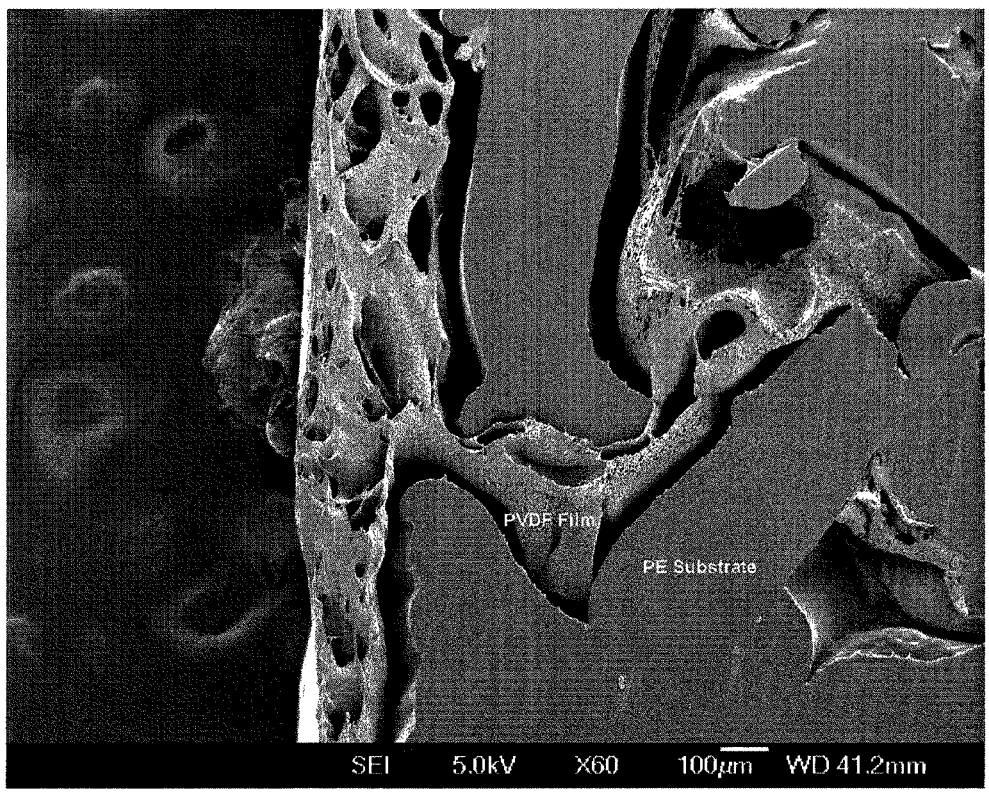
FIG. 1 provides a 60× scanning electron microscopy ("SEM") photograph of a cross-section of a comparative porous PVDF membrane cast onto a porous polyethylene substrate where the membrane is not bonded to the substrate.

The present invention encompasses a variety of composite porous materials. It will be appreciated that the various inventive aspects or features described herein are separate and independent. Accordingly, a composite porous material or article formed in accordance with the principles of the present invention need not have more than one of the invention features described herein and/or may have a combination of two or more features described herein.

In one aspect, the present invention relates to a first material (which, in one embodiment, may be considered to be a "substrate") having pores of a first average pore size and a second material (which, in one embodiment, may be considered to be a "membrane") having pores of a second average pore size substantially smaller than the first average pore size. In one embodiment, the second material can coat at least part of a surface of the first material. In another embodiment, the second material can be in at least some of the pores of the first material. In another embodiment, the second material can coat at least part of a surface of the first material and the second material can be in at least some of the pores of the first material. In other embodiments, the second material can coat at least part of a surface of the first material and/or at least partially fill some or all of the pores of the first material. In another embodiment, the average pore size of the second material is substantially smaller than that of the first material. The term "substantially smaller," when used to refer to average pore size, means that an average pore of the second material is capable of being present within the average pore of the first material. In aspects of the present invention, the term "substantially smaller," when used to refer to average pore size, means about 3, 5, 7, 10, 25, 50, 75, 100, greater than about 100, 125, 150, 175, 250, 500, 1,000, or 10,000 times smaller, as determined by methods known in the art and/or disclosed herein. In other aspects of the present invention, the average pore size of the second material is about 3, 5, 7, 10, 25, 50, 75, or 100 times smaller than the average pore size of the first material. In other aspects of the present invention, the average pore size of the second material is greater than about 100 times smaller or about 125, 150, 175, 250, 500, 1,000, or 10,000 times smaller than the average pore size of the first material.

Although in actuality typically not separable into distinct components or layers, a composite porous material of the present invention can be considered as having at least two components. As used herein and unless otherwise indicated, the term "substrate" refers to a porous first material layer. Specific first materials can be sintered. In aspects of the present invention, the thickness of the first material is at least about 100 μm, at least about 250 μm, at least about 400 μm, at least about 600 μm, at least about 800 μm, or at least about 1,000 μm. In aspects of the present invention, the thickness of the first material is up to about 10 cm, up to about 5 cm, or up to about 1 cm. In aspects of the present invention, the thickness of the first material is from about 100 μm to about 10 cm, from about 250 μm to about 5 cm, or from about 1,000 μm to about 1 cm.

As used herein and unless otherwise indicated, the term "membrane" refers to a second material layer that forms a microfiltration, ultrafiltration, or nanofiltration membrane structure on top of and/or inside the first material. In aspects of the present invention, the second material is less than about 10,000, 1,000, 500, 400, 300, 250, 125, 100, 75, 50, 25 or 10 μm thick, and is fluid (e.g., water or air) permeable. In aspects of the present invention, the thickness of the first material is at least about 1.5, 2, 5, 10, 100, 250, 500, 1,000or 10,000 times the thickness of the second material. In another embodiment, the thickness of the first material is approximately equal to the thickness of the second material. The second material, in accordance with one aspect of the present invention, is adhered onto at least part of a surface of the first material and/or is adhered to the walls of at least some of the pores of the first material.

As known in the art, some membranes, so-called asymmetric membranes, contain a very dense top layer or "skin" supported by the porous sublayer of the membrane. In one embodiment of the present invention, the second material is an asymmetric membrane. Asymmetric membranes are said to combine the high selectivity of a dense membrane with the high permeation rate of a very thin membrane. (See e.g., M. Mulder, *Basic Principles of Membrane Technology*, Kluwer Academic Publishers, Dordrecht, (1996) pp. 12-14; U.S. Pat. No. 4,824,568, col. 1, lines 42-56; and published European Patent Application Number 0596411, p. 2, lines 32-38). Optionally, the second material of the present invention has such a skin on the second material at a surface distal to the first material. The thickness of the skin, if present, is up to about 0.1 times the thickness of the second material.

In aspects of the present invention, greater than about 1, 2, 5, 10, 25, 50, 75, 90, 95, 99, or 99.9%, or about 100% of the first material's pores have therein some of the second material. As used herein, and unless otherwise indicated, the term "percent of the pores" refers to the percent of the total porous volume of the first material that is occupied after application of the second material, and can be determined by techniques known in the art (e.g., mercury porosimetry and SEM).

In aspects of the present invention, the average pore size of the first material is at least about 1 μm, at least about 2 μm, at least about 5 μm, at least about 10 μm, or at least about 25 μm. In aspects of the present invention, the smallest average pore size of the first material is influenced by the desired fluid flow rate through the composite porous material of which it is a part. In aspects of the present invention, the average pore size of the first material is up to about 200 μm, up to about 100 μm, or up to about 50 μm. In aspects of the present invention, the largest average pore size of the first material is influenced by its ability to provide mechanical support to the composite porous material of which it is a part. In aspects of the present invention, the average pore size of the first material is from about 1 μm to about 200 μm, from about 1 μm to about 100 μm, from about 2 μm to about 200 μm, from about 25 μm to about 200 μm, from about 5 μm to about 100 μm, or from about 10 μm to about 50 μm. In aspects of the present invention, when the composite porous materials of the present invention are used in microfiltration applications, the average pore size of the first material is from about 1 μm to about 200 μm or from about 25 μm to about 200 μm. In aspects of the present invention, when the composite porous materials of the present invention are used in ultrafiltration applications, the average pore size of the first material is from about 1 μm to about 200 μm or from about 1 μm to about 100 μm. The average pore size of the first material alone can be determined using mercury porosimetry, e.g., using the AUTOPORE III Model 9420 porosimeter from Micromeritics Inc. (Norcross, Ga.), or microscopy, e.g., SEM. In aspects of the present invention, the first material has an average porosity of about 20, 30, 40, 50, 60, or 75%.

In aspects of the present invention, the average pore size of the second material is at least about 0.0002 μm, at least about 0.01 μm, or at least about 0.1 μm. In aspects of the present invention, the average pore size of the second material is up to about 10 μm, up to about 5 μm, up to about 2 μm, or up to about 0.1 μm. In aspects of the present invention, the average pore size of the second material is from about 0.0002 μm to about 10 μm, from about 0.01 μm to about 5 μm, from about 0.01 μm to about 0.1 μm, from about 0.1 μm to about 10 μm, or from about 0.1 μm to about 2 μm. In aspects of the present invention, when the composite porous materials of the present invention are used in microfiltration applications, the average pore size of the second material is from about 0.1 μm to about 10 μm. In aspects of the present invention, when the composite porous materials of the present invention are used in ultrafiltration applications, the average pore size of the second material is from about 0.01 μm to about 0.1 μm.

In aspects of the present invention, the average pore size of the first material is at least about 3, 5, 7, 10, 25, 50, 75, 100, greater than about 100, 125, 150, 175, 250, 500, 1,000, or 10,000 times the average pore size of the second material.

The average pore size and/or porosity of a composite porous material of the present invention can be determined by known techniques, such as SEM. Invasive techniques, such as mercury porosimetry, can also be used. For example, one such technique can be used to determine the porosity of a first material (or a porous substrate in one embodiment) before it is used in the preparation of a composite porous material in accordance with the principles of the present invention. That technique can then be used to determine the porosity of the resulting composite porous material. Using the two results, those skilled in the art can readily determine, from the difference, the porosity of the second material (or a membrane in another embodiment) in the pores of the first material.

In accordance with another aspect of the present invention, combinable with but not necessarily present in any of the above-described embodiments, the second material adheres strongly to the surface and/or pore walls of the first material. Such strong adherence may be achieved in any desired manner. In one embodiment, the first material is contacted with an admixture of a solvent and a polymer and, optionally, an inorganic salt (to improve polymer solubility, as further discussed below). One aspect of the present invention relates, in part, to a discovery that by selecting the solvent such that the second material and the first material are each soluble in the solvent, a composite porous material can be made with a first material and a second material that adhere strongly to each other and thus are highly resistant to processes such as delamination. As used herein and unless otherwise indicated, a polymer, such as the second material, is "soluble" in a solvent if, when 1 g of the polymer and 100 g of the solvent are brought into contact at atmospheric pressure and from about 20° C. to about 70° C., e.g., at 25° C., optionally with stirring, no solid polymer residue is visible to the eye after about 4 hours.

In one embodiment, e.g., to facilitate strong adhesion to each other, the first material and the second material comprise or are formed from the same polymer or same copolymer. That is, in connection with the "same polymer," each polymer is formed from a monomer of the identical chemical structure. In connection with the "same copolymer," each copolymer (e.g., copolymer "1" and "2") is formed from common monomers, i.e., two or more monomers (e.g., "A" and "B"), the A monomers in copolymer 1 having the identical chemical structure to the A monomers in copolymer 2 and the B monomers in copolymer 1 having the identical chemical structure to the B monomers in copolymer 2. For example, for the purposes of this application, linear and branched polyethylene, each being formed from ethylene monomer, are considered to be the same polymer. In another example, two copolymers, each being made up of two monomers, such as acrylonitrile and vinyl chloride, but differing in the ratio of acrylonitrile to vinyl chloride monomer present in each copolymer are, for the purposes of this application, considered to be the same polymer. In yet another example, two polymers formed from a single monomer but differing in their weight average molecular weight are, for the purposes of this application, considered to be the same polymer. In yet a further example, two copolymers, each copolymer being formed from the same three monomers but differing in their weight average molecular weight, are, for the purposes of this application, considered to be the same polymer. Examples of polymers of this embodiment include, but are not limited to fluoropolymers, such as polyvinylidene fluoride ("PVDF"), polyolefins, such as polyethylene and polypropylene, polyacrylonitrile and modacrylics, such as DYNEL (a copolymer of acrylonitrile and vinyl chloride), polyether imide, polyetherether ketone ("PEEK"), and polyvinyl chloride ("PVC").

As used herein, a "copolymer" includes a polymer comprising at least two different monomer subunits. Thus, a polymer chain comprising three different monomers (also known as a terpolymer) is included within the term "copolymer," as is a polymer chain comprising more than three different monomer subunits. As used herein, the term "polymer" includes a homopolymer and a copolymer.

In another embodiment, e.g., to facilitate strong adhesion to each other, the first material and the second material comprise or are formed from a similar polymer or a similar copolymer. That is, in connection with the "similar polymer," each polymer comprises a monomer of the identical chemical structure. In connection with the "similar copolymer," each copolymer (e.g., copolymer "1" and "2") is formed from a common monomer, ie., two or more monomers (e.g., "A", "B" and "C"), the A monomers in copolymer 1 having the identical chemical structure to the A monomers in copolymer 2 and the B monomers in copolymer 1 differing in chemical structure compared to the C monomers in copolymer 2. For example, for the purposes of this application, a first polymer formed from vinylidene fluoride and a second polymer formed from vinylidene fluoride and ($CH_2$—$^{13}CF_2$), are, for the purposes of this application, considered to be similar polymers because they each have a common monomer—vinylidene fluoride. In another example, high density polyethylene and ultra low density polyethylene (ULDPE), each formed from ethylene (and, for ULDPE, a small quantity of another olefinic monomer), are, for the purposes of this application, considered to be similar polymers because they each have a common monomer—ethylene. In another example, two copolymers, one a random copolymer and the other a block copolymer, each being made up of two monomers, such as styrene and butadiene, are, for the purposes of this application, considered to be similar polymers. In yet another example, two copolymers, the first, formed from ethylene and propylene, and the second, formed from ethylene, propylene and 1-hexene, are, for the purposes of this application, considered to be similar polymers because they each have two common monomers.

In another embodiment, e.g., to facilitate strong adhesion to each other, the first material and the second material comprise or are formed from polymers or copolymers comprising a related monomer (e.g., "A" and "A'"), i.e., each is from the same "polymer family." For example, for the purposes of this application, poly(methyl methacrylate) and poly(ethyl methacrylate) are so described because their constituent monomers are related, differing only in the number of carbon atoms in their ester group, as are poly(methyl methacrylate) and poly(methyl acrylate), differing only in the presence or absence of a methyl substituent. In connection with copolymers from the same polymer family, each copolymer (e.g., copolymer "1" and "2") is formed from a related monomer, e.g., for monomers "A", "A'", "B" and "C", the A monomers in copolymer 1 having a chemical structure related to the chemical structure of the A' monomers in copolymer 2 and the B monomers in copolymer 1 differing in chemical structure compared to the C monomers in copolymer 2. Polymer families are known in the art, e.g., polymer text books often identify such "polymer families" formed from similar monomers. For example, in F. W. Billmeyer, Jr., *Textbook of Polymer Science* (Wiley-Interscience, New York, 2nd ed. 1971), polyolefins, polystyrenes, acrylics, poly(vinyl esters), chlorine-containing polymers (e.g., PVC), fluoropolymers, polyamides, ether and acetal polymers, polyesters, polyurethanes, and cellulosics are each disclosed as a separate polymer family. Chemical encyclopedias often identify such "polymer families" as well. For example, the *Kirk-Othmer Encyc. of Chem. Technol.* (4th ed. 1991-1998) has separate listings for many types of polymer families, including but not limited to fluoropolymers, polyacrylates, polyacrylonitrile, polyamides, polyesters, polyetherimides, polyetherketones, polyetherketoneketones, polyethersulfones, polyolefins, polyethylenes, polypropylenes, polysulfones, polyvinyl chloride, and vinyl polymers.

In another embodiment, e.g., to facilitate strong adhesion to each other, the polymer comprising the first material and the polymer comprising the second material are each soluble in a solvent, i.e., have a common solvent. As used herein, "common solvent" means, for example, that if polymer "P" is soluble in solvent "X" and polymer "Q" is soluble in solvent "X", then solvent "X" is a common solvent for polymer "P" and polymer "Q". As used herein, "common solvent" includes an admixture comprising a plurality of solvents. For example, in one embodiment the common solvent is an admixture of two solvents, e.g., a mixture of dimethylacetamide and dimethyl formamide, in any appropriate proportion.

In another embodiment, the first material and/or the second material is made from a fluoropolymer, i.e., a polymer or copolymer comprising fluorine, such as, but not limited to polyvinyl fluoride, such as the TEDLAR product line from DuPont (Wilmington, Del.), and PVDF, such as the KYNAR and KYNAR FLEX product lines, e.g., KYNAR FLEX 2800, KYNAR 500, and KYNAR 460, from Atofina Chemicals, Inc. (Philadelphia, Pa.). In another embodiment, the first material and/or the second material is made from PVDF. In another embodiment, the first material and/or the second material is made from a polyolefin, such as but not limited to polyethylene, such as the HOSTALEN GUR product line, e.g., HOSTALEN GUR 400, from Ticona Engineering Polymers (Florence, Ky.), and polypropylene, such as the PROFAX product line from Basell NV (Hoofddorp, Netherlands). In another embodiment, the first material and/or the second material is made from polyethylene. In another embodiment, the first material and/or the second material is made from polypropylene. In another embodiment, the first material and/or the second material is made from an acrylic, such as but not limited to polyacrylonitrile, such as the BAREX product line from BP Petrochemicals (Naperville, Ill.), and a modacrylic, such as a copolymer of acrylonitrile and vinyl chloride, such as the DYNEL product line formerly available from Union Carbide (Danbury, Conn.). In another embodiment, the first material and/or the second material is made from polyacrylonitrile. In another embodiment, the first material and/or the second material is made from a copolymer of acrylonitrile and vinyl chloride. In another embodiment, the first material and/or the second material is made from polyether imide, such as but not limited to the ULTEM product line, e.g., ULTEM 1000, from GE Advanced Materials (Pittsfield, Mass.). In another embodiment, the first material and/or the second material is made from polyetherether ketone, such as but not limited to the KADEL product line from Solvay Advanced Polymers (Alpharetta, Ga.) and the PEEK product line from Victrex PLC (UK). In another embodiment, the first material and/or the second material is made from a chlorine-containing polymer, such as but not limited to PVC, e.g., the GEON product line from Geon Co. (Avon Lake, Ohio). In another embodiment, the first material and/or the second material is made from PVC.

In another embodiment, the first material and/or the second material is made from a polysulfone, such as but not limited to the ASTREL polysulfone product line from 3M (Minneapolis, Minn.) and the UDEL polysulfone product line, e.g., UDEL P-3500 and UDEL P-3500 LCD, and the MINDEL polysulfone blend product line, from Solvay Advanced Polymers. In another embodiment, the first material and/or the second material is made from a polyethersulfone, such as but not limited to the RADEL A polyethersulfone product line from Solvay Advanced Polymers. In another embodiment, the first material and/or the second material is made from a polyester, such as but not limited to the EKTAR polyester product line from Eastman Chemical Co. (Kingsport, Tenn.) and polyethylene terephthalate, e.g., the IMPET polyester product line from Ticona. In another embodiment, the first material and/or the second material is made from a polyamide, such as but not limited to the CELANESE PA6,6 product line from Ticona and the CAPRON PA6 polyamide product line and ULTRAMID PA6, PA6,6 and PA6/6,6 product lines from BASF (Wyandotte, Mich.).

Another embodiment of the present invention, independent of the above-identified embodiments yet combinable therewith, encompasses a material comprising a porous second material fused to a sintered porous first material, thereby providing a composite porous material, where the two materials are formed of the same polymer. Another embodiment of the present invention, independent of the above-identified embodiments yet combinable therewith, encompasses a material comprising a porous second material fused to a sintered porous first material, thereby providing a composite porous material, where the two materials are formed of similar polymers. Another embodiment of the present invention, independent of the above-identified embodiments yet combinable therewith, encompasses a material comprising a porous second material fused to a sintered porous first material, thereby providing a composite porous material, where the two materials are formed of polymers from the same polymer family. Another embodiment of the present invention, independent of the above-identified embodiments yet combinable therewith, encompasses a material comprising a porous second material fused to a sintered porous first material, thereby providing a composite porous material, where the two materials are formed of polymers that have a common solvent.

In a specific embodiment, the second material is applied directly to the first material, i.e., no other solid or liquid is allowed to intervene between the second material and the first material. In another specific embodiment, the second material is fused directly to a sintered first material, ie., no other solid or liquid is allowed to intervene between the second material and the first material. In another specific embodiment, the second material is fused directly to the surface of a sintered first material. In another specific embodiment, the second material is fused directly to some of the pore walls of a sintered first material. In another specific embodiment, the second material is fused directly to the surface of and directly to some of the pore walls of a sintered first material.

As used herein and unless otherwise indicated, the term "fused" refers to an adherence or direct physical bonding between two components, e.g., a first material and a second material or a substrate and a membrane, which may each be of the identical material or of different materials. In fused composite porous materials of the present invention, the first material and second material are in contact, and at least a portion in contact are directly connected and difficult to separate into their components. Accordingly, the second material, such as when it forms the membrane, is resistant to delamination from the first material, such as when it forms the substrate, and a more robust composite porous material is thereby achieved, e.g., when compared with prior art filters or filter materials.

In another embodiment, the present invention encompasses a tube comprising a sintered porous tubular first material formed from a first material having pores of a first average size, with a second material in at least some of the first material's pores. The second material has pores of a second average size substantially smaller than the first average size and forms a second material on the interior surface of the tubular first material, is fused directly to some of the pore walls of the tubular first material, and the first material and the second material are comprised of the same polymer, similar polymers, or from the same polymer family, or are soluble in a common solvent.

The First Material

The first material typically is formed in a given desired configuration and, in one embodiment, may be considered a substrate for carrying the second material which may be considered to be a membrane. In another embodiment, the first material is in the form of a planar sheet; in another embodiment, the first material is in the form of a hollow tube; in another embodiment, the first material is in the form of any other molded shape.

A variety of methods known to those skilled in the art can be used to make porous first materials. Some examples include sintering, such as disclosed by U.S. Pat. No. 6,030,558 which is incorporated by reference herein in its entirety; the use of blowing agents and/or leaching agents; microcell formation methods, such as disclosed by U.S. Pat. Nos. 4,473,665 and 5,160,674, each of which is incorporated by reference herein in its entirety; drilling, including laser drilling; and reverse phase precipitation. Depending on how it is made, a porous first material can thus have regular arrangements of channels of random or well-defined diameters and/or randomly situated pores of varying shapes and sizes. Pore sizes are typically referred to in terms of their average diameters, even though the pores themselves are not necessarily spherical.

Preferred first materials of the present invention are made by sintering particles of at least one polymer (e.g., plastic) and, optionally, particles of other additives. These optional additives can include, but are not limited to, those known in the art such as lubricants, colorants, functional additives, antimicrobial components, antistatic components, and fillers. In one embodiment, an additive is provided in the form of particles.

In one embodiment, the polymer particles and optional additive particles are admixed to provide a relatively uniform solid dispersion, which is then sintered. Depending on the desired size and shape of the final product (e.g., a block, tube, cone, cylinder, sheet, or film), this can be accomplished using a mold or other techniques known to those skilled in the art. In another embodiment, the solid dispersion is sintered in a mold. Suitable molds are commercially available and are known to those skilled in the art. Specific examples of molds include, but are not limited to, flat sheets with a thickness of greater than about 0.01 inch (254 µm), flat sheets with a thickness of up to about 1 inch (2.54 cm), flat sheets with a thickness of from about 0.01 inch (254 µm) to about 1 inch (2.54 cm), and round cylinders of varying heights and diameters. Suitable mold materials include, but are not limited to, metals and metal alloys, such as aluminum and stainless steel, and high temperature thermoplastics.

In one embodiment, a compression mold is used to provide the sintered first material. In this embodiment, the mold is heated to the sintering temperature of the first material, allowed to equilibrate, and then subjected to pressure. This pressure typically is greater than about 1 psi (6,890 Pa) and typically is less than about 100 psi (689,000 Pa), depending on the composition of the material being sintered and the desired porosity of the final product. In general, the greater the pressure applied to the mold, the smaller the average pore size and the greater the mechanical strength of the final product. The duration of time during which the pressure is applied also varies depending on the desired porosity of the final product.

Once the porous first material has been formed, the mold is allowed to cool. If pressure has been applied to the mold, the cooling can occur while pressure is still being applied or after pressure has been removed. The sintered first material is then removed from the mold and optionally processed. Examples of optional processing include, but are not limited to, sterilizing, cutting, milling, polishing, encapsulating, and/or coating.

Using methods such as those described above, a variety of materials of varying sizes and shapes can be used to provide a suitable porous first material. In one embodiment, the particles sintered are of approximately the same size, i.e., having a range of sizes such that 50% of the particles by number are within ±50% of the average particle size. In this embodiment, the particles' size is relatively uniform (e.g., as determined using commercially available screens), i.e., the particles' size distribution is relatively narrow. This is believed to be advantageous because particles of approximately equivalent size can be consistently packed into molds, and because a narrow particle size distribution allows the production of a uniformly porous first material (ie., a first material comprising pores that are evenly distributed throughout it and/or are approximately equivalent in size). This is also advantageous, e.g., for filtering fluids, because fluids tend to flow more evenly through uniformly porous materials than materials of approximately equivalent average porosity but having regions of high porosity and low porosity. Uniformly porous first materials are also less likely to have structural weak spots than materials which comprise unevenly distributed pores of substantially different sizes. In view of these benefits, if a material is commercially available in particle form, it is preferably screened or sieved prior to use to ensure a desired average size and narrow size distribution. However, many polymers are not commercially available in particle form. Consequently, methods such as cryogenic grinding and underwater pelletizing can be used to prepare particles of a given polymer.

Cryogenic grinding is a known method that can be used to prepare particles and optional additive particles of varying sizes. However, because cryogenic grinding typically provides little control over the sizes of the particles it produces, particles made by this method may require further processing, e.g., screening, to ensure that the particles to be sintered are of a desired average size and narrow size distribution.

Particles for forming the first material of the present invention can also be made by so-called "underwater pelletizing." Underwater pelletizing is described, for example, in column 3 of U.S. Pat. No. 6,030,558 to Smith et al., which is incorporated by reference herein in its entirety. This method offers several advantages. Underwater pelletizing provides accurate control over the average size of the particles produced, in many cases thereby eliminating the need for an additional screening step and reducing the amount of wasted material. Another advantage of underwater pelletizing is that it allows significant control over the particles' shape. Another advantage of underwater pelletizing is that, when spherical particles are desired, the almost perfectly spherical shape of the resultant particles allows for sintered materials with greater strength to be obtained. Another advantage of underwater pelletizing is that, due to the almost spherical shape of the resultant particles, superior, more uniform sintered first materials for coating with a second material solution, wherein the solution flows into a uniform, smooth, porous first material, can result in a more uniform composite porous material. Another advantage is that underwater pelletizing may enhance the chemical and/or temperature compatibility range of porous tubes formed from underwater pelletized particles. A further advantage of underwater pelletizing is that during underwater pelletizing, it is possible to compound active materials, e.g., antiviral or antimicrobial agents such as those disclosed in columns 6-9 of U.S. Pat. No. 6,551,608 B2 to Yao (which is incorporated by reference herein in its entirety), and/or common additives for polymers, e.g., fillers, such as carbon black, and other additives known in the art, such as those compiled in the Concise Polymeric Materials Encyclopedia, J. C. Salamone, Ed. (CRC Press LLC, Boca Raton, Fla., 1999), pp. 23-29 (which is incorporated by reference herein in its entirety), into the particles to impart performance or physical characteristics to the first material.

Particle formation using underwater pelletizing typically requires an extruder or melt pump, an underwater pelletizer, and a drier. A plastic first material is fed into an extruder or a melt pump and heated until molten. The molten material is then forced through a die. As the material emerges from the die, at least one rotating blade cuts it into pieces referred to as "pre-particles." The rate of extrusion and the speed of the rotating blade(s) determine the shape of the pre-particles, while the diameter of the die hole determines their average size. A cooling fluid or coolant capable of increasing the rate at which the pre-particles cool, e.g., water (hence the "underwater" in "underwater pelletizing"), flows over the cutting blade(s) and through the cutting chamber. The fluid solidifies the pre-particles into particles, which are then separated from the coolant (e.g., water), dried, and collected.

The average size of particles produced by underwater pelletizing can be accurately controlled from at least about 0.01 inches (254 µm) in diameter. The average size of underwater pelletized particles can be accurately controlled up to about 0.25 inches (0.64 cm) in diameter. The average size of underwater pelletized particles can be from about 0.01 inches (254 µm) to about 0.25 inches (0.64 cm) in diameter. The average particle size can be adjusted simply by changing dies, with larger-hole dies yielding proportionally larger particles. The average shape of the particles can be optimized by manipulating the extrusion rate, the temperature of the coolant used in the method and/or the cutter speed of the pelletizer.

While the characteristics of a porous material can depend on the average size and size distribution of the particles used to make it, the material characteristics can also be affected by the particles' average shape. In accordance with one aspect of the present invention, the particles of the first material may be substantially spherical. Substantially spherical particles, and particularly those with smooth edges, also tend to sinter evenly over a well defined temperature range to provide a final product with desirable mechanical properties and porosity. This shape facilitates the efficient packing of the particles within a mold. As used herein to describe a particle, the term "substantially spherical" means that the particle is spherical or that the length of its longest radius is no greater than about 2 times, preferably no greater than about 1.5 times, more preferably no greater than about 1.2 times the length of its shortest radius. When used to describe a mixture or collection of particles, the term "substantially spherical" means greater than about 50 wt. %, preferably greater than about 75 wt. %, more preferably greater than about 90 wt. %, and most preferably greater than about 95 wt. % of the particles are substantially spherical. In one embodiment, the first material is comprised of particles that are sintered together. In another embodiment, the first material is comprised of substantially spherical particles that are sintered together.

In accordance with one aspect of the present invention, if the first material particles used are commercially available or made by cryogenic grinding, optionally they may be thermal fined to ensure smooth edges and/or screened to ensure a proper average size and size distribution. Thermal fining is a known process wherein particles are rapidly mixed and optionally heated such that their rough edges become smooth. See e.g., U.S. Pat. No. 6,551,608 B2 to Yao. Mixers suitable for thermal fining include the W series high-intensity mixers available from Littleford Day, Inc., Florence, Ky. Particles made by underwater pelletizing, which allows precise control over particle size and can yield smooth, substantially spherical particles, need not be thermal fined or screened although such post-pelletizing processing can optionally be used.

The particular method used to form the pores or channels of a porous first material and the resulting pore structure (e.g., average pore size and/or porosity) of the porous first material can vary according to the desired application to which the final composite porous material will be put. As known in the art, "porosity" is the ratio of the void volume relative to the volume calculated based on the perimeter dimensions of a sample. The desired porosity of the first material can also be affected by the characteristics or properties of the first material itself. For example, porosity can be affected in different ways by the shape of the first material and/or its physical properties (e.g., tensile strength and durability). Thus, forming the first material from different materials having differing properties can affect the strength and/or performance of (e.g., flux of a fluid through) the resulting composite porous material.

In one embodiment, the first material has sufficient structural stability to allow the composite porous material comprising the same to take on a shape. In another embodiment, the first material has sufficient structural stability to withstand exposure to, e.g., the solvent of, a second material solution. In another embodiment, the first material has sufficient structural stability to provide structural integrity to the composite porous material during its use, e.g., under high pressure or under fluid flow, without requiring any further supporting layer.

In another embodiment, the first material of a composite porous material has a "coarse" pore structure, i.e., a first average pore size greater than about 5 µm and at least about 10 times the pore size of the second material's second average pore size, which is believed to allow the coarse first material to impart structural stability to the composite porous material of which it is a component.

Characteristics of the Composite Porous Materials of the Invention

The composite porous materials of the present invention provide many advantages, e.g., they are resistant to the detrimental effects of high pressure, are delamination resistant, can be steam-sterilized, and have greater backpressure resistance, which allows for better cleaning and extended membrane life.

The present invention encompasses several embodiments and inventive features or aspects, as described above, which may appear alone or in conjunction in a composite porous material formed in accordance with the principles of the present invention. For instance, in one embodiment the present invention encompasses a composite porous material tube comprising a sintered porous tubular first material formed from a first material having pores of a first average size, with a second material in at least some of the first material's pores. The second material has pores of a second average size substantially smaller than the first average size. The second material is fused directly to some of the pore walls of the tubular first material and the first material and the second material are comprised of or formed from the same polymer or a similar polymer or from the same polymer family.

In another embodiment, the present invention encompasses a composite porous material tube comprising a sintered porous tubular first material formed from a first material having pores of a first average size, with a second material in at least some of the first material's pores. The second material has pores of a second average size substantially smaller than the first average size. The second material is fused directly to some of the pore walls of the tubular first material and the polymer component of the first material and the second material are comprised of or formed from the same polymer or a similar polymer or from the same polymer family.

In another embodiment, the present invention encompasses a composite porous material where the first material has a polymer component that consists essentially of a single polymer. In another embodiment, the present invention encompasses a composite porous material where the second material has a polymer component that consists essentially of a single polymer. In another embodiment, the present invention encompasses a composite porous material where the first material has a polymer component that consists essentially of a single polymer and the second material has a polymer component that consists essentially of a single polymer.

In another embodiment, the present invention encompasses a composite porous material where the first material has a polymer component that consists essentially of at least two polymers, for example, two polymers. In another embodiment, the present invention encompasses a composite porous material where the second material has a polymer component that consists essentially of at least two polymers.

In another embodiment, the present invention encompasses a composite porous material where the first material has a polymer component that consists essentially of a single polymer and the second material has a polymer component that consists essentially of at least two polymers. In another embodiment, the present invention encompasses a composite porous material where the first material has a polymer component that consists essentially of at least two polymers and the second material has a polymer component that consists essentially of a single polymer. In another embodiment, the present invention encompasses a composite porous material where the first material has a polymer component that consists essentially of at least two polymers and the second material has a polymer component that consists essentially of at least two polymers.

In another embodiment, the porous second material is present on one (or more) surface(s) of the porous first material. In a specific embodiment, the porous second material is a membrane on one (or more) surface(s) of the porous first material. In another specific embodiment, the second material which forms the membrane on one (or more) surface(s) of the porous first material is also in the pores of the first material and, particularly, on at least some of the pore walls within the first material. It is believed that such membranes can limit the diffusion rate through, yet enhance the separating ability of, such composite porous materials.

In a specific embodiment, one or each of the first material and the second material are comprised of additional polymers. For instance, the second material may be comprised of PVDF, while the first material may be comprised of an admixture of PVDF and another polymer; the first material may be comprised of PVDF, while the second material may be comprised of an admixture of PVDF and another polymer, e.g., polyvinylpyrrolidone ("PVP"); or the first material may be comprised of an admixture of PVDF and another polymer, while the second material may be comprised of an admixture of PVDF and another polymer, where the another polymer admixed in the first material may be identical to or different from the another polymer admixed in the second material.

The structure of specific materials formed in accordance with the principles of the present invention can be understood with reference to the attached figures. For example, for the purposes of comparison, FIG. 1 provides an SEM image at a magnification of 60 times ("60×" or "×60") of a comparative structure made by casting PVDF on a polyethylene substrate but not having the PVDF fused to the polyethylene substrate in accordance with principles of the present invention. It is clear from this image that the porous PVDF membrane is not fused to the polyethylene substrate.

Figure 2:
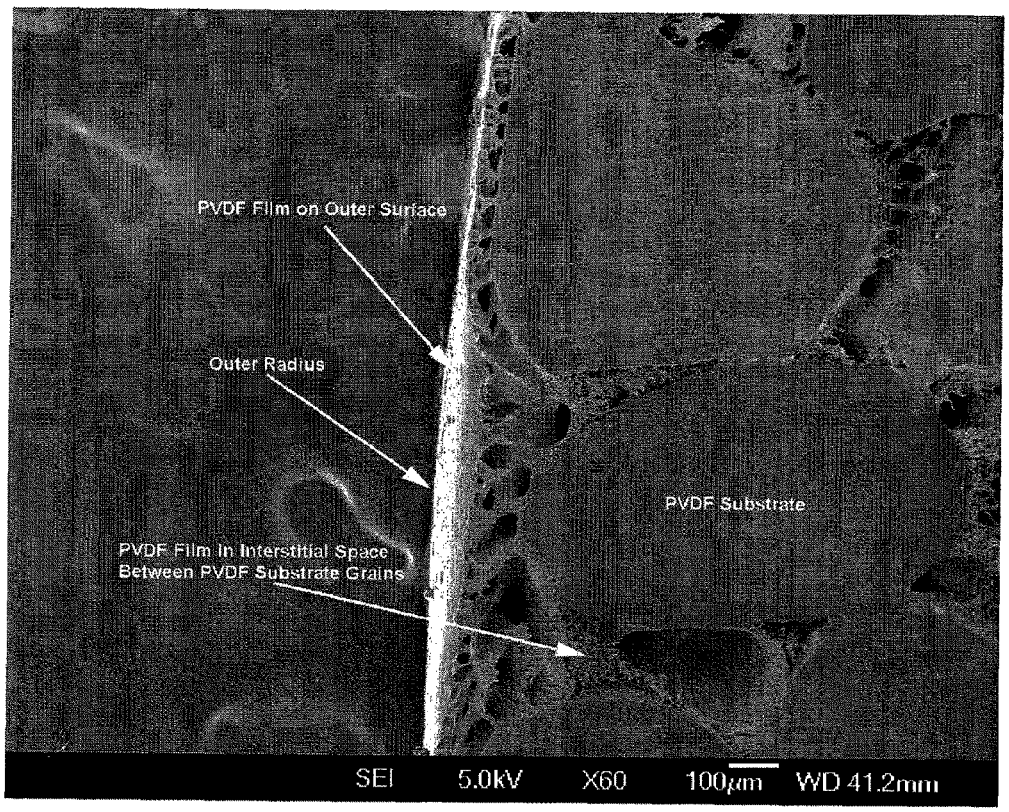
FIG. 2 provides a 60× SEM photograph (same magnification as FIG. 1) of a cross-section of an exemplary composite porous material formed in accordance with the principles of the present invention containing porous PVDF second material in the pores of an exemplary porous tubular PVDF first material.

FIG. 2 provides an SEM image at a magnification of 60× of an exemplary composite porous material formed in accordance with the principles of the present invention made by depositing a PVDF second material to form a PVDF second material on a PVDF first material, as described below in Example 3. Upon comparison with FIG. 1, at the same magnification as FIG. 2, it is clear from FIG. 2 that the porous second material is fused to pore walls of the first material. FIG. 2 also illustrates that the second material is present on the surface (e.g., the outer surface) of the first material. The second material is characterized by an average pore size of about 0.1 μm, which is substantially smaller than the average pore size of the surrounding area of the first material (about 80 μm). One can further note from FIG. 2 that the second material is in the pores of the first material in the areas adjoining the pore walls.

Figure 3:
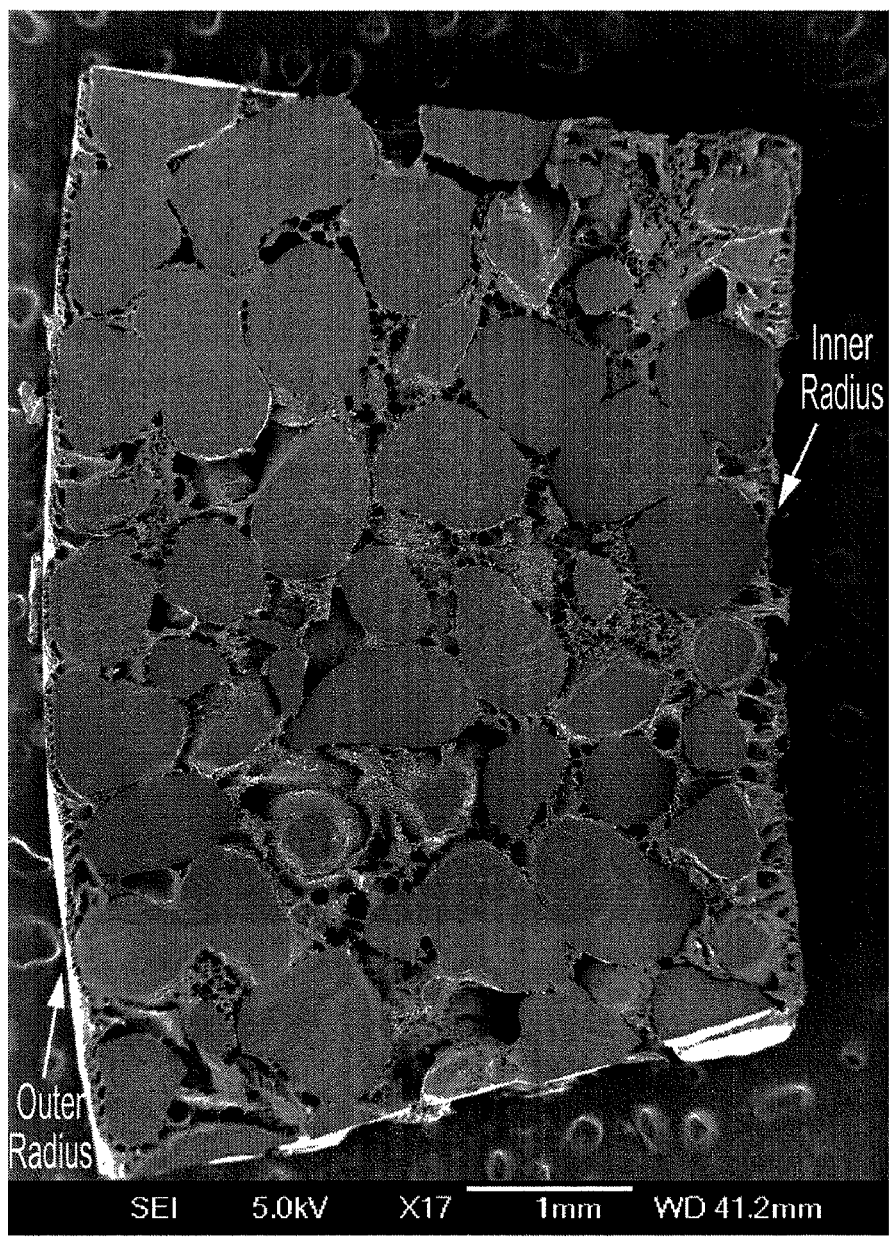
FIG. 3 provides a 17× SEM photograph of a cross-section of the exemplary composite porous material of FIG. 2.
Figure 4:
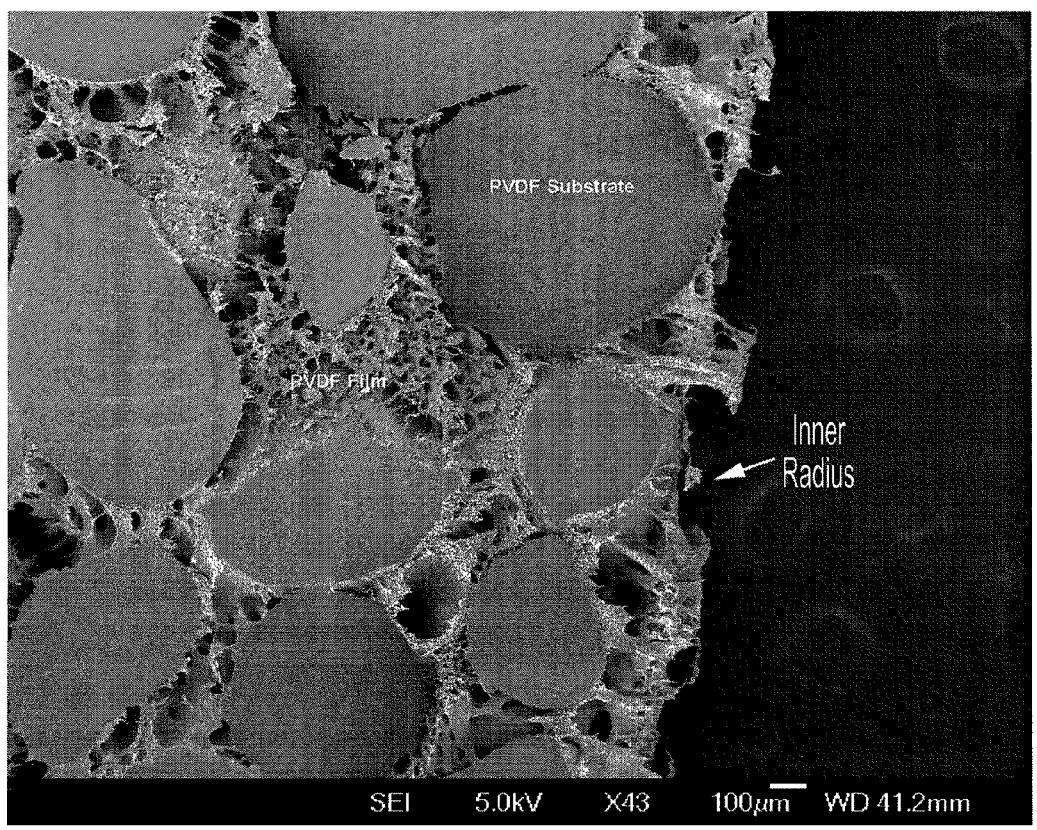
FIG. 4 provides a 43× SEM photograph of a cross-section near the inner radius of the exemplary composite porous material of FIG. 2.
Figure 5:
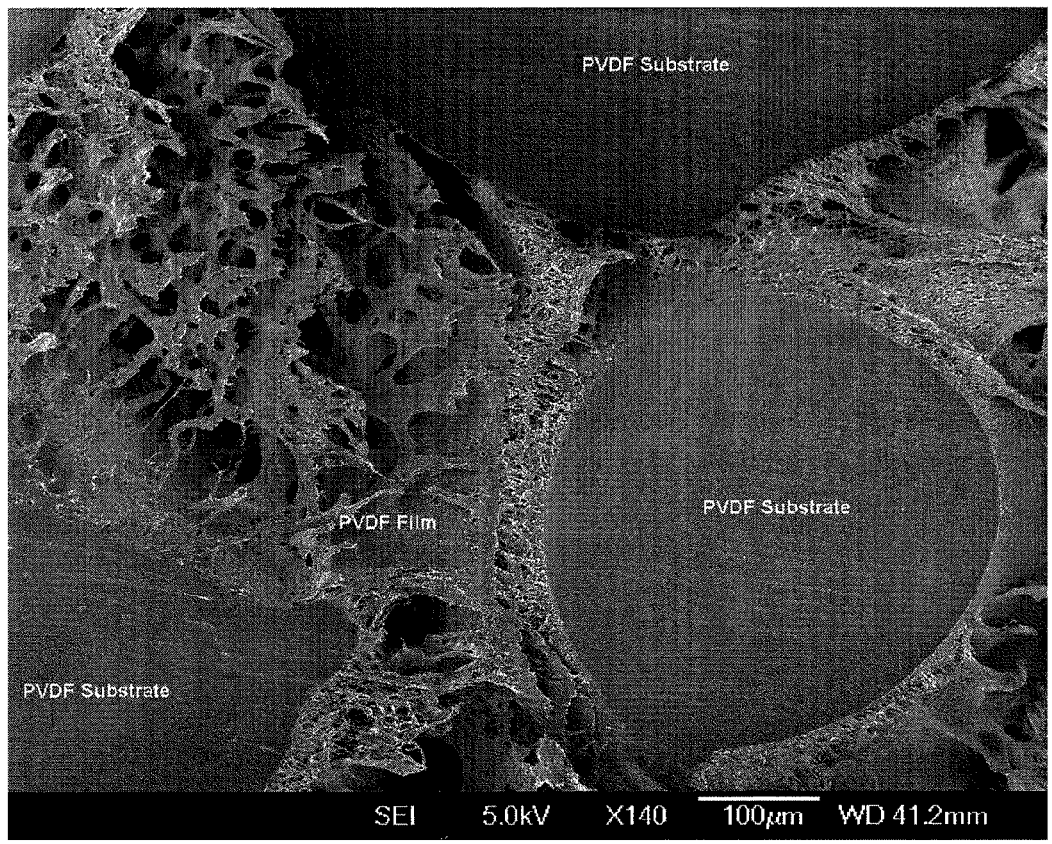
FIG. 5 provides a 140× SEM photograph of a cross-section of the exemplary composite porous material of FIG. 2, magnified from FIG. 4 to illustrate the porous PVDF second material in the pores.

FIGS. 3, 4 and 5 each provide an SEM image of the exemplary composite porous material formed in Example 3. FIG. 3 is at a magnification of 17×. FIG. 4 is at a magnification of 43×. FIG. 5 is at a magnification of 140×. As is clear from each of these images, the porous second material is fused to pore walls of the first material. These figures also show, for example, that the second material is in the pores of the first material.

Figure 6:
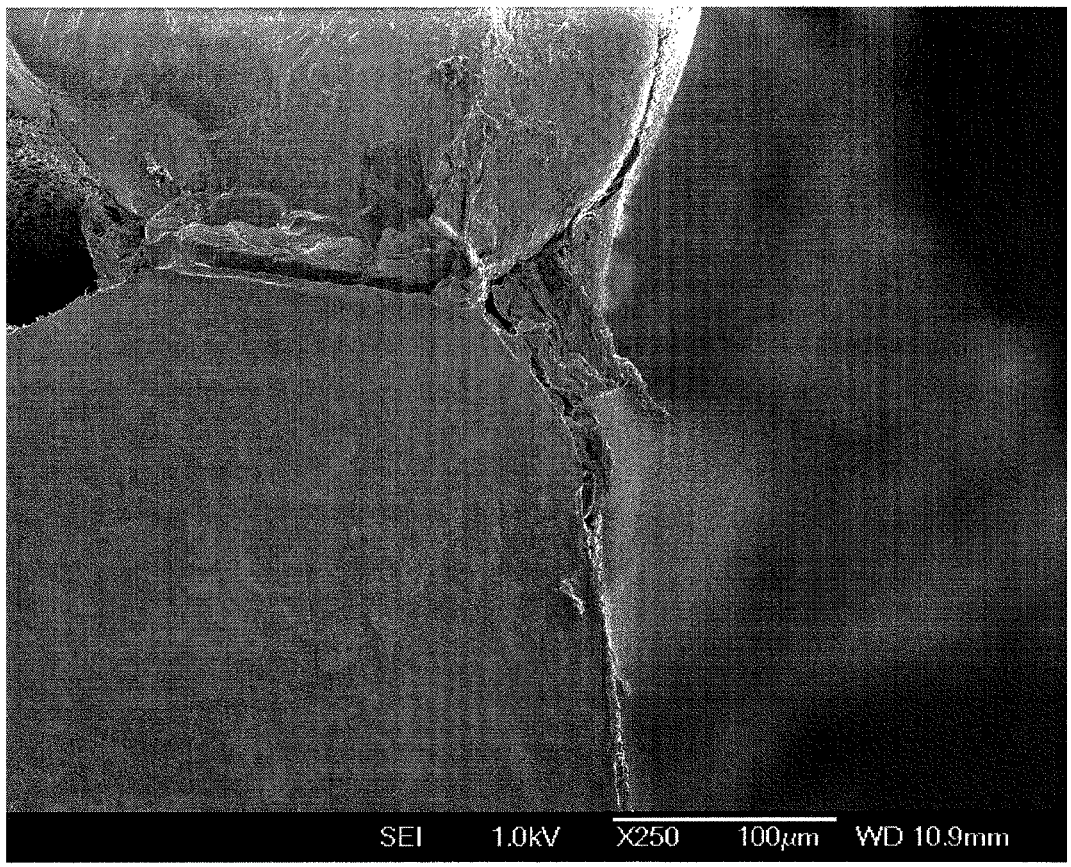
FIG. 6 provides a 250× SEM photograph of a cross-section near the inner radius of the exemplary composite porous material of FIG. 2.

FIG. 6 provides an SEM image at a magnification of 250× of the exemplary composite porous material formed in Example 3. This figure shows, for example, that the second material coats at least part of a surface of the first material, at least a portion of the second material is fused to the first material, and that the second material is in some of the pores of the first material, at least a portion of the second material being fused to some of the pore walls of the first material.

Figure 7:
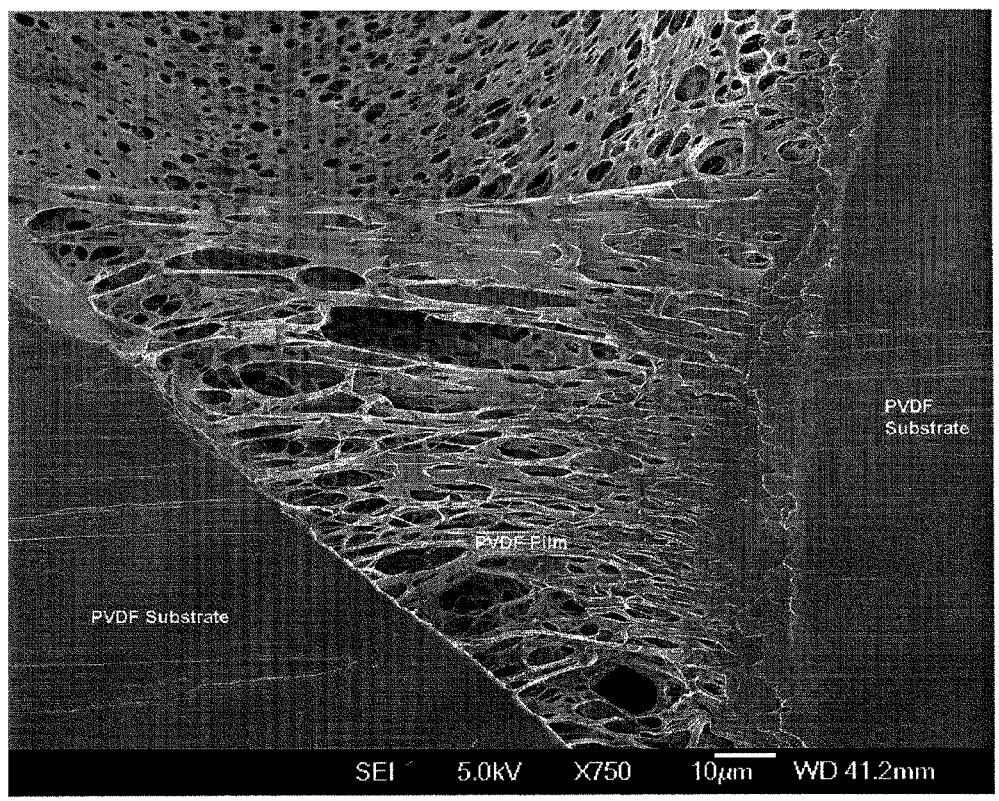
FIG. 7 provides a 750× SEM photograph of a cross-section of the exemplary composite porous material of FIG. 2, magnified to illustrate the porous PVDF second material in the pores.
Figure 8:
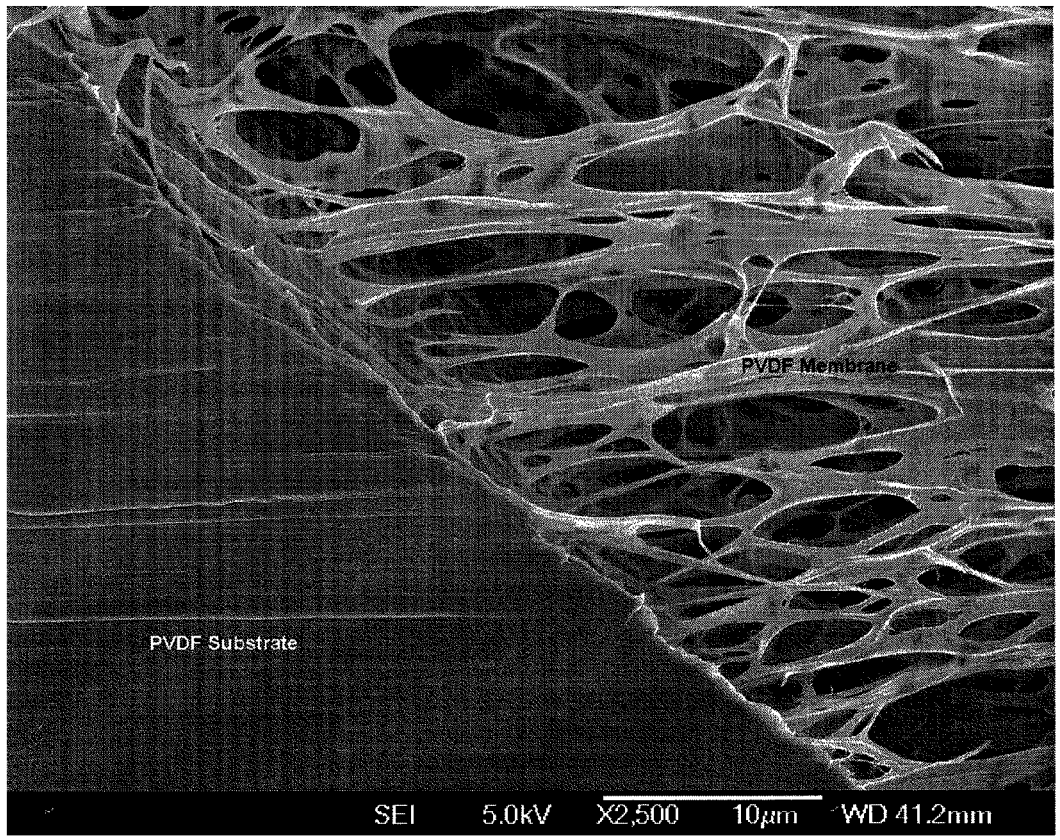
FIG. 8 provides a 2,500× SEM photograph of a cross-section of the exemplary composite porous material of FIG. 2, magnified from FIG. 7 to illustrate the porous PVDF second material in the pores.

FIGS. 7 and 8 each provide an SEM image of the exemplary composite porous material formed in Example 3. FIG. 7 is at a magnification of 750×. FIG. 8 is at a magnification of 2,500×. These figures show, for example, that at least a portion of the second material is fused to the first material.

Figure 9:
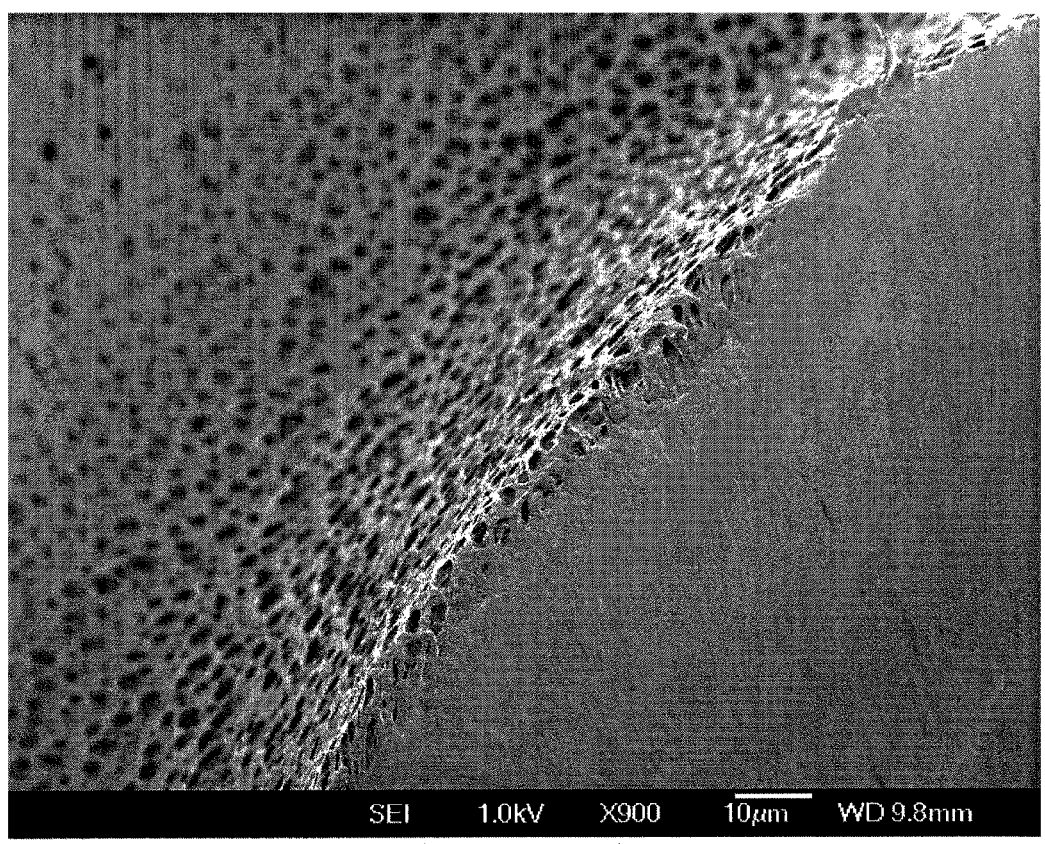
FIG. 9 provides a 900× SEM photograph of a plan view of the exemplary composite porous material of FIG. 2, magnified to illustrate a surface of the second material in a pore of the first material.
Figure 10:
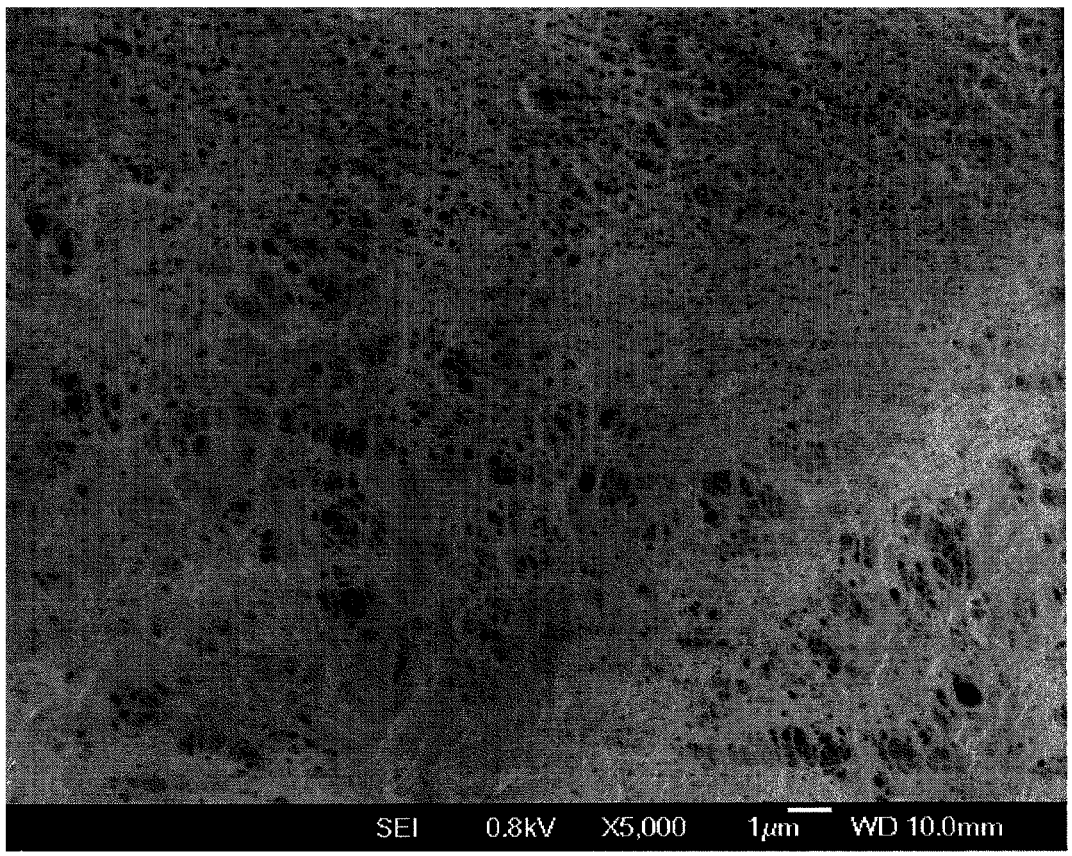
FIG. 10 provides a 5,000× SEM photograph of a plan view of the exemplary composite porous material of FIG. 2, magnified to illustrate a surface of the second material.

FIGS. 9 and 10 each provide an SEM image of the exemplary composite porous material formed in Example 3. FIG. 9 is at a magnification of 900×. FIG. 10 is at a magnification of 5,000×. These plan-view figures show, for example, the pores of the second material. FIG. 9 also shows, for example, the pore structure of the second material in the pores of the first material. FIG. 10 also shows, for example, the pore structure of the second material on the surface of the first material.

Methods of Making the Composite Porous Materials of the Invention

A variety of methods can be used to make the second material that is in the pores of the porous first material described above and/or contacts its surface.

In accordance with another aspect of the present invention, the invention encompasses a method of making a composite porous material which comprises depositing a solution of a solvent and a second material polymer soluble in the solvent onto a sintered porous first material. Either the first material is the same polymer, a similar polymer, or from the same polymer family as the second material, or the first material polymer is soluble in the solvent.

In accordance with another aspect of the present invention, the invention encompasses a method of making a composite porous material which comprises depositing a solution of a solvent, a second material polymer soluble in the solvent, and an inorganic salt onto a sintered porous first material. Either the first material is the same polymer, a similar polymer, or from the same polymer family as the second material, or the first material polymer is soluble in the solvent.

In one embodiment, the second material is formed by depositing a solution of at least one polymer, solvent, and optionally but preferably, an inorganic salt onto the porous first material and precipitating the polymer from the deposited solution under conditions sufficient to deposit the porous second material on the surface and/or in the pores of the first material.

The solvent is selected so that the second material polymer(s) is soluble in it. Solvents that can be used in the solution are known in the art, and can vary depending upon the specific polymer used and the desired properties of the resulting porous second material. Examples of solvents include, but are not limited to, dimethylacetamide ("DMAc"), dimethyl sulfoxide ("DMSO"), dimethyl formamide ("DMF"), N-methyl pyrrolidinone ("NMP"), triethylphosphate ("TEP"), isopropyl alcohol ("EPA"), triethylene glycol, mineral oil, and any mixture thereof.

Inorganic salts are known in the art and can be varied depending on the specific polymer used and the desired properties of the resulting porous second material. Examples of inorganic salts include, but are not limited to, lithium chloride, zinc chloride, sodium chloride, potassium chloride, lithium bromide, zinc bromide, sodium bromide, potassium bromide, and any mixture thereof. In one embodiment, the inorganic salt is lithium chloride, zinc chloride, or any mixture thereof. In another embodiment, the inorganic salt is lithium chloride.

Deposition of the second material solution can be facilitated by using a suitable spreading/leveling device while the solution contacts the first material, e.g., a squeegee, such as the glass rod described in Example 2 below. Deposition of the second material solution can also be facilitated by using a suitable solution-pushing device, e.g., a squeegee, such as the steel ball and the glass rod described in Examples 3 and 10 below, respectively, after the solution has contacted the first material.

In accordance with one aspect of the present invention, a solution-pushing device may be uniquely shaped for applying an even coating of material solution to the interior of a tubular element. For instance, the solution-pushing device may be elongated, e.g., rod-like or cylindrical. In particular, the shape of the solution-pushing device may be selected to include contacting surfaces conforming to the tubular element. For example, a solution-pushing device for applying a material solution to the interior surface of a tubular element may include cylindrical contact areas conforming to the cylindrical interior of the tubular element. The dimensions of the solution-pushing device may be selected to control the amount and/or thickness and/or uniformity of the material solution being deposited. Deposition of the material solution can also be facilitated by using a suitable device during and following contact of the material solution to the element to which the solution is to be applied.

In accordance with another aspect of the present invention, in which a polymer solution is applied to the interior surface of a tube, combinable with but not necessarily present in any of the above-described embodiments, instead of spreading/leveling or pushing the solution, the solution can be applied via a hollow second material applicator, e.g., the torpedo applicator described in Example 4 below, that dispenses solution as it moves through the bore of a porous tube, in one embodiment a porous first material tube and, in another embodiment, a tubular substrate. For instance, the applicator may have an interior cavity and one or more passages from the interior cavity to the exterior of the applicator. A polymer solution, such as a second material solution in one embodiment and a membrane solution in another embodiment, may be supplied to the interior cavity within the applicator, such as by a supply tube, and allowed to pass from the interior cavity through the passages to the exterior of the hollow applicator. Thus, upon relative axial movement of the tubular element and the applicator positioned within the tubular element, and upon supplying solution to the applicator, solution is dispensed and applied along the interior surface of the tubular element. As such, metered dispensing of, e.g., the second material solution, provides controlled application conditions for and deposition of the solution, and resultant uniformity and/or smoothness of the material onto the tubular element is facilitated. Additionally, use of the applicator allows for less solution to be used, thereby providing a more economical method. The speed and/or pressure at which solution is supplied to the applicator may be selected to achieve the desired thickness and/or uniformity and/or smoothness of the solution applied to the interior surface of the tubular element.

In one embodiment, a drive rod is provided to impart movement to the applicator. For the sake of convenience, in another embodiment the drive rod also functions as the supply tube that supplies solution to the interior of the applicator for application to the interior surface of the tubular element.

Figure 11:
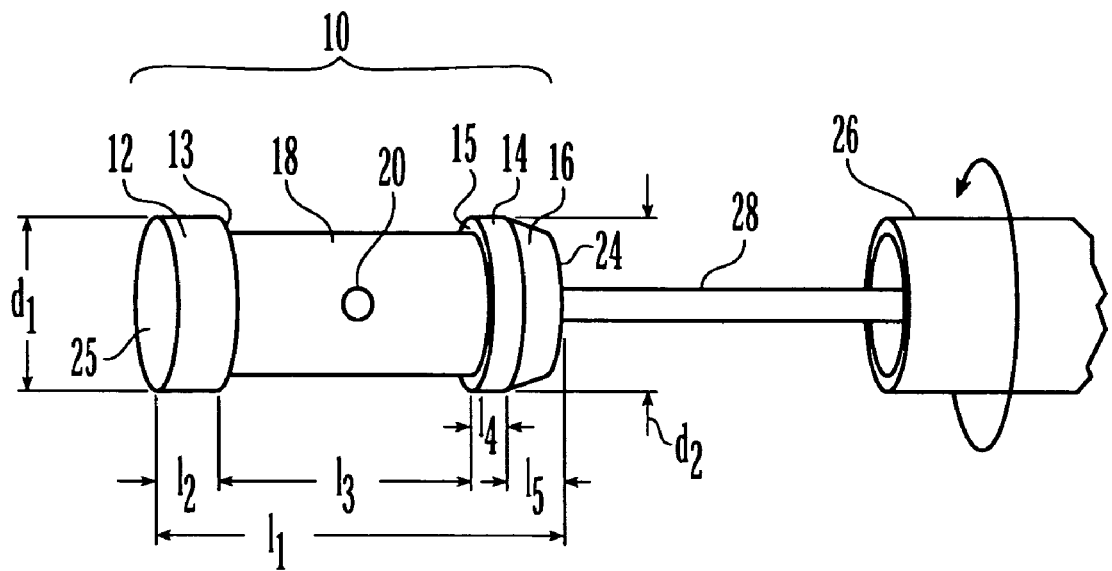
FIG. 11 illustrates an exemplary torpedo applicator for applying a membrane material within a tubular substrate.

If desired, a reservoir may be formed along the exterior surface of the applicator and the passage(s) extending from the hollow interior of the applicator to the exterior of the applicator feeds solution to the reservoir. For example, reservoir 18 in the torpedo applicator of FIG. 11 is such a reservoir. The reservoir is configured to retain a supply of solution, e.g., between reservoir walls 13 and 15, at the exterior of the applicator and thereby to allow uniform application of solution to the interior surface of the tubular element.

In one embodiment, the applicator may be shaped and configured to facilitate application of a material solution to the interior surface of a tubular element and to control the amount and/or thickness and/or uniformity of the material deposited thereon. For instance, the applicator may be elongated, e.g., rod-like or cylindrical in shape. In particular, the orientation of an elongated applicator is more readily controllable than a non-elongated, e.g., spherical or cube-like, applicator. Thus, an elongated applicator is beneficial when a reservoir is provided along the exterior of the applicator, as the readily maintained orientation of an elongated applicator readily orients the reservoir with respect to the interior surface of the tubular element.

In one embodiment, the applicator may have a tapered, e.g., cone-shaped, initial insertion leading edge to allow for easy initial insertion into the tubular element and alignment of the applicator in the tubular element. In another embodiment, the applicator has a tapered application leading edge (i.e., the leading edge during application of solution) to allow for easy insertion into the tubular element to initiate application of the solution. In another embodiment, the applicator has a tapered initial insertion leading edge and a tapered application leading edge.

The dimension of the applicator may be selected to achieve the desired thickness and/or uniformity and/or smoothness of the solution applied to the interior surface of the tubular element. For example, the difference in dimension between the applicator, e.g., the outer diameter at the radial surface contact areas 12 and 14 of the torpedo applicator in FIG. 11, and the interior surface dimension of the tubular element, e.g., the inner diameter of the tubular substrate 26 in FIG. 11, is established to retain the solution in the applicator reservoir and to allow for liquid pressure build-up against the interior surface of the tubular element while simultaneously controlling the amount and/or thickness and/or uniformity of the solution deposited on the interior surface of the tubular element. Selection of the difference in dimensions of the outer diameter of the applicator and the inner diameter of the tubular element is influenced by factors such as the viscosity of the solution, surface tension of the solution, and the surface energy of the interior surface of the tubular element. In one instance, if the difference in dimension between the outer diameter of the applicator and the inner diameter of the tubular element is too small, then ease of movement of the applicator within the tubular element can be hindered. In another instance, if the difference in dimension between the outer diameter of the applicator and the inner diameter of the tubular element is too large, then the solution may not be confinable by the walls of the reservoir, and/or solution may be applied in a not readily controlled manner The exterior cross-sectional shape of the applicator may be selected to match the interior cross-sectional shape of the tubular element. For example, the applicator and the tubular element each can have a circular, elliptical, rectangular, or square cross-section. Another benefit of shaping the applicator's cross-section to conform to the interior cross-section of the tubular element is that the applicator may be initially passed through the bore of the tubular element, once or a plurality of times, before introducing any solution. By doing so, irregularities of the interior surface of the tubular element can be reduced or eliminated, e.g., deburring can occur, optionally with removal of loose debris, e.g., by vacuuming.

In one embodiment, for a tubular element with a circular cross-section, more uniform deposition of the solution can be facilitated by relative rotation of the applicator and the tubular element, particularly during application of solution to the interior surface of the tubular element. Rotation can be imparted in any way known in the art, such as manually or using a speed-controlled rotation apparatus, e.g., for the tubular element, a driven, flip-up go-cart tire (with a flat, no-marking tire surface) on an axle, a horizontal roller mixer, or power-driven conveyor rollers of sufficient length to support the tubular element positioned horizontally. In one embodiment, a series of rollers can be used to provide for simultaneous processing of a series of tubular elements. In aspects of the present invention, the relative rotational speed is at least about 10 rpm, or at least about 36 rpm. In aspects of the present invention, the relative rotational speed is up to about 100 rpm, or up to about 44 rpm. In aspects of the present invention, the relative rotational speed is from about 10 rpm to about 100 rpm, or from about 36 rpm to about 44 rpm.

Relative axial movement of the applicator and tubular element, once or a plurality of times, can be brought about in any way known in the art, such as manually, e.g., using a linear motion table with a manual crank and timer control, or using a speed-controlled pulling apparatus, e.g., an adjustable speed puller such as those available from Gatto Corp. (Bay City, Mich.), a lathe carriage, or a programmable logic controller controlled linear actuator. In aspects of the present invention, the relative speed of the applicator and tubular element is at least about 20 cm/min, or at least about 25 cm/min. In aspects of the present invention, the relative speed of the applicator and tubular element is up to about 305 cm/min, or up to about 165 cm/min. In aspects of the present invention, the relative speed of the applicator and tubular element is from about 20 cm/min to about 305 cm/min, or from about 25 cm/min to about 165 cm/min.

The pressure of the solution supplied to the applicator can be regulated in any way known in the art, e.g., using a gravity-driven pressure head or a constant pressure output pump. In aspects of the present invention, the pressure is at least about 3 psi (20,700 Pa), or at least about 4 psi (27,600 Pa). In aspects of the present invention, the pressure is up to about 10 psi (69,000 Pa), or up to about 8 psi (55,200 Pa). In aspects of the present invention, the pressure is from about 3 psi to about 10 psi, or from about 4 psi to about 8 psi.

The volumetric flow rate of the solution supplied to the applicator can be regulated in any way known in the art. In aspects of the present invention, the volumetric flow rate is at least about 10 mL/min, or at least about 40 mL/min. In aspects of the present invention, the volumetric flow rate is up to about 200 mL/min, or up to about 140 mL/min. In aspects of the present invention, the volumetric flow rate is from about 10 mL/min to about 200 mL/min, or from about 40 mL/min to about 140 mL/min.

The applicator of the present invention that applies a solution to the interior surface of a tubular element can be used when the longitudinal-axis of the tubular element is oriented either horizontally (see, e.g., Example 4) or vertically (see, e.g., Example 8).

In one aspect of the present invention, because the solvent dissolves the second material (e.g., the membrane in one embodiment) and the first material (e.g., the substrate in one embodiment), it is believed that the solvent can act to dissolve, or at least to soften, the surface of the porous first material during solution deposition such that at least a portion of the porous second material fuses to the surface of the porous first material. In another embodiment, the first material and the second material, which come in contact with each other, comprise or include the same polymer and, accordingly, the solvent can dissolve or soften that polymer of each material, thereby promoting the fusing of the first and second materials at their contact(s). In another embodiment, the first material and the second material, which come in contact with each other, comprise or include similar polymers and, accordingly, the solvent can dissolve or soften the similar polymer of each material, thereby promoting the fusing of the first and second materials at their contact(s). In another embodiment, the first material and the second material, which come in contact with each other, comprise or include a polymer component from the same polymer family and, accordingly, the solvent can dissolve or soften that polymer component of each material, thereby promoting the fusing of the first and second materials at their contact(s).

Once the solution is deposited onto the first material, e.g., in any of the ways described above, the resulting product thereof can be contacted with, e.g., immersed in, a miscible fluid which is miscible with the solvent of the second material solution but is a non-solvent for the polymer of the second material dissolved in the solution. Such contact is known in the art to result in a porous second material. The porous second material of a composite porous material is formed upon precipitation of the polymer(s) from the polymer solution. Properties of the second material can be varied by controlling parameters such as the amount(s) and types of polymer(s) in solution, the solvent type, the inorganic salt additive (s), the coating thickness, the immersion bath composition, and the immersion bath temperature. The effects provided by these variables are known in the art and readily determined.

Water is a preferred miscible fluid in many cases, although other fluids can be employed. For example, water-alcohol solutions can be employed. Contacting with the miscible fluid may be done by any suitable method known in the art, e.g., immersing in a miscible-fluid bath. In one embodiment, the composite porous material is immersed in one bath of a miscible fluid. In another embodiment, the composite porous material is immersed in successive baths of miscible fluid(s). In another embodiment, each successive bath contains the same miscible fluid. In another embodiment, each successive bath contains a different miscible fluid.

Optionally, after contact with any/all miscible fluids, the composite porous material can be washed. Optionally, after contact with any/all miscible fluids, the composite porous material can be dried. Optionally, after contact with any/all miscible fluids, the composite porous material can be washed then dried. Washing may be done with any suitable liquid known in the art, e.g., water. Washing may be done by any suitable method known in the art, e.g., immersing the composite porous material in a wash-liquid bath. Drying may be done by any suitable method known in the art, e.g., drying the composite porous material in air at about 25° C. or using a conventional belt or stationary dryer at a temperature of about 25° C. or at an elevated temperature.

In a specific embodiment, the composite porous material is prepared by depositing a second material solution containing a polymer (e.g., PVDF) at a concentration of at least about 5 wt. % and an inorganic salt (e.g., LiCl) in a solvent (e.g., DMAc or a 50/50 mixture by volume of DMAc and NMP) onto a porous first material. In another specific embodiment, the composite porous material is prepared by depositing a second material solution containing a polymer (e.g., PVDF) at a concentration of up to about 20 wt. % and an inorganic salt (e.g., LiCl) in a solvent (e.g., DMAc or a 50/50 mixture by volume of DMAc and NMP) onto a porous first material. In another specific embodiment, the composite porous material is prepared by depositing a second material solution containing a polymer (e.g., PVDF) at a concentration of from about 5 wt. % to about 20 wt. % and an inorganic salt (e.g., LiCl) in a solvent (e.g., DMAc or a 50/50 mixture by volume of DMAc and NMP) onto a porous first material. In each of the specific embodiments of this paragraph, the resulting product thereof is then contacted with a miscible fluid comprising water.

Methods of Using the Composite Porous Materials of the Invention

The composite porous materials of the present invention have uses in a variety of applications including, but not limited to, filtration processes such as microfiltration, ultrafiltration, and nanofiltration. Materials of the present invention can also be used in microfiltration processes which operate at higher than normal pressures, i.e., pressures typically associated with ultrafiltration or nanofiltration processes.

Examples of applications for which microfiltration is suitable include dust collection, cold sterilization of beverages and pharmaceuticals, cell harvesting, clarification of fruit juices, beer or wine, waste water treatment, oil-water separation, and continuous fermentation. Examples of applications for which ultrafiltration is suitable include pretreatment of sea water in desalinization plants, sea water purification, recovery of whey protein from milk, and wastewater treatment for reuse as process water. Examples of applications for which nanofiltration is suitable include reforming dyes and filtering lactose from milk.

Another aspect of the present invention encompasses a method of filtering a fluid comprising passing the fluid through a composite porous material of the invention.

Another aspect of the present invention encompasses a method of filtering a liquid (e.g., water, sea water, wastewater, beverages) comprising passing the liquid through a composite porous material of the invention.

Another aspect of the present invention encompasses a method of filtering a gas (e.g., air) comprising passing the gas through a composite porous material of the invention.

The following examples are set forth to assist in understanding the present invention and should not be construed as specifically limiting the invention described and claimed herein. Such variations of the present invention, including the substitution of all equivalents now known or later developed, which would be within the purview of those skilled in the art, and changes in formulation or changes in experimental design, are to be considered to fall within the scope of the invention incorporated herein.

EXAMPLES

Example 1

Preparation of Second Material Solution I

Preliminary to depositing a second material onto a porous first material in accordance with an exemplary embodiment of the present invention, two separate chemical solutions, Intermediate Solution A and Intermediate Solution B, were prepared then combined to form Second Material Solution I as follows.

Intermediate Solution A

To a one gallon (3.8 liter) high-density polyethylene ("HDPE") milling jar/carboy, 100 grams of lithium chloride (LiCl) and 2,500 grams DMAc were added. A lid was secured onto the carboy with duct tape and the carboy was placed on a roller mill operating at 20 rpm for two hours, after which the LiCl appeared to be fully dissolved. The carboy was opened and 520 grams of PVDF (KYNAR 2800 from Atofina Chemicals, Inc.) were added. The PVDF was slowly combined with the solution, stirring with a glass rod to avoid air bubbles. The lid was then secured onto the carboy with duct tape and the carboy was replaced on the 20 rpm roller mill until a solution appearing homogenous formed (after about 4-10 hours). Intermediate Solution A was examined for color (e.g., a yellowish appearance), air bubbles, and/or gel lumps of non-dissolved PVDF. Since none of these conditions was evident, the lid was secured onto the carboy with duct tape and the carboy was placed in a temperature-controlled room (maintained at about 25° C.) for further use.

Intermediate Solution B

To another one gallon HDPE milling jar/carboy containing 900 grams of NMP, 100 grams of PVP (grade K-90 obtained from ISP Technology Inc. (Wayne, N.J.)), were added. The combination was stirred gently with a glass rod. The lid was secured onto the carboy with duct tape and the carboy was placed on a roller mill operating at 20 rpm until Intermediate Solution B, appearing homogenous, formed (after about 4-10 hours). Intermediate Solution B was examined for color (e.g., a yellowish appearance), air bubbles, and/or gel lumps of non-dissolved PVP. Since none of these conditions was evident, the lid was secured onto the carboy with duct tape and the carboy was placed in a temperature-controlled room (maintained at about 25° C.) for further use.

Second Material Solution I

At about 25° C., Intermediate Solution A was combined with Intermediate Solution B to form Second Material Solution I by adding Intermediate Solution A to the carboy containing Intermediate Solution B. The lid of the Intermediate Solution B carboy was secured onto the carboy with duct tape and the carboy was placed on the 20 rpm roller mill until a solution appearing homogenous formed (after about 6 hours). The carboy was removed from the mill and Second Material Solution I was examined for color and solid polymer particles. Since neither of these conditions was evident, the lid was secured onto the carboy with duct tape and the carboy was placed in a temperature-controlled room (maintained at about 25° C.) for further use.

Example 2

Applying a Second Material onto a Planar First Material

Example 2 describes a non-limiting embodiment of the present invention where a second material solution was applied to a porous planar substrate comprising a first material. Each step described below was performed at a temperature of about 25° C.

An 8 inch by 8 inch (20.3×20.3 cm) planar sheet of sintered porous PVDF about 0.25 inches (0.64 cm) thick, with a porosity of about 40% and an average pore size of about 80 μm, obtained from Porex Corporation (Fairbum, Ga.), was placed on the clean, flat, smooth, level glass top of a table. Each corner of the sheet was fastened to the table's surface with electrical tape. Three layers of 0.75 inch (1.9 cm) wide electrical tape were placed on the table's surface beyond each edge of the sheet. The thickness of the three layers of tape, about 0.015 inches (0.038 cm), corresponded to the desired wet thickness of the second material.

An aliquot of Second Material Solution I was poured from the carboy into a 100 mL glass beaker. From this beaker, about 20 mL of Second Material Solution I was poured onto the sheet along a line approximately 2 inches (5.1 cm) away from the edge of the sheet to form a bead. A 2-inch (5.1 cm) diameter, 8-inch (20.3 cm) long glass rod was used as a squeegee to spread the bead of solution evenly and to remove excess second material solution from the sheet. This was done by drawing the rod, with its longitudinal-axis parallel to the bead, from top to bottom slowly (over about 30 seconds) and steadily over the sheet with downward pressure from beyond the outside edge of the top strip of tape to beyond the outside edge of the bottom strip of tape. A timer was started immediately upon completion of removing the excess solution.

After 3 minutes had elapsed, the electrical tape was cut at all four corners, releasing the coated sheet from the table. The sheet was held suspended for three minutes in a flat position and with the coated side up, and then was carefully transported to a 12 inch long by 12 inch wide by 6 inch deep (30.5×30.5×15.2 cm) glass tray filled with about 4 inches (10 cm) of tap water. The sheet, coated side up, was then immersed steadily into the water bath over about a 10 second period and held by hand suspended for about 3 minutes. Thereafter, the sheet was released and allowed to lie flat on the bottom of the tray for about 24 hours.

Following its removal from the tray, the sheet was placed into another tray like the one described previously but containing a 5 wt. % solution of glycerin in tap water for 30 minutes. Following its removal from that solution, the sheet was dried in air for 24 hours. The resulting composite porous sheet had a first material porous substrate with an average pore size of about 80 μm and a second material porous membrane with an average pore size of about 0.1 μm. A portion of the sheet of sintered porous PVDF of dimensions 7.5 inch by 7.5 inch (19.1×19.1 cm) weighed 240 g before the Second Material Solution I was applied. After drying as described above, the weight of the composite porous sheet of the same dimensions formed therefrom had increased by 5 g.

Example 3

Applying a Second Material onto a Vertically-Oriented Tubular First Material

Example 3 describes a non-limiting embodiment of the present invention where a second material solution was applied to a porous tubular substrate comprising a first material. Each step described below was performed at a temperature of about 25° C.

A porous tube, obtained from Porex Corporation and formed from sintered PVDF, was used. The porous tube measured 36 inches (91.4 cm) in length and had a 1 inch (2.5 cm) inner diameter and a 1.330 inch (3.4 cm) outer diameter.

With the porous tube positioned vertically over a beaker and the tube's bottom hole capped to retain solution, Second Material Solution I, comprising PVDF and described in Example 1, was poured into the tube. After 15 minutes, the excess solution was drained into the beaker and a stainless steel machinist gauge ball 2.5 cm in diameter was dropped into the bore of the porous tube to act as a squeegee for the excess solution inside the tube. Then, a 1.125 inch (2.86 cm) inner diameter stainless steel slide ring was manually slid down the outer diameter of the tube to act as a squeegee for the excess solution on the outside of the tube.

While holding the coated porous tube with its longitudinal-axis vertical, the tube was slowly submersed (over about 30 seconds) into a drumlike-bath containing about 55 gallons (208 L) of tap water and allowed to sink until it touched the bottom of the bath. The tube remained in the bath for about 24 hours.

Following its removal from the bath, while holding the coated porous tube with its longitudinal-axis vertical, the tube was submersed into another bath containing a 5 wt. % solution of glycerin in tap water for 30 minutes. Following its removal from that bath, the tube was dried in air for about 24 hours. The tube weighed 400 g before the Second Material Solution I was applied. After drying as described above, the weight had increased by 15 g.

The resulting composite porous tube had a first material porous substrate with an average pore size of about 80 μm and a second material porous membrane with an average pore size of about 0.1 μm. As evident from, e.g., FIGS. 2-10 discussed above, the porous second material membrane was in the pores of the porous first material substrate and the porous second material was fused to at least some of the pore walls of the porous first material substrate.

Example 4

Applying a Second Material onto a Horizontally-Oriented Tubular First Material with a Torpedo Applicator Example 4 describes a non-limiting embodiment of the present invention where a second material solution was applied to a porous tubular substrate comprising a first material by using an applicator with a tapered or conical leading edge (the "torpedo applicator"). Each step described below was performed at a temperature of about 25° C.

Figure 12:
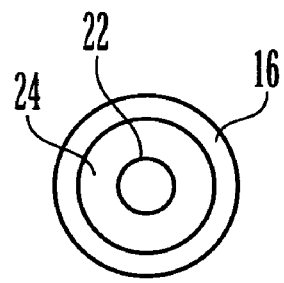
FIG. 12 illustrates an end view of the torpedo applicator of FIG. 11.

Torpedo Applicator: A torpedo applicator 10, as depicted in FIGS. 11 and 12, was machined from 304 grade stainless steel. The torpedo applicator 10 depicted in FIG. 11 had a total length $l_1$ of 5.08 cm. As the second material solution was to be applied to the interior surface of the porous tubular substrate, the maximum diameter of torpedo applicator 10 (2.489 cm) was determined by the interior surface diameter of the porous tubular substrate 26 (2.515 cm). The torpedo applicator 10 had an initial insertion leading edge radial surface contact area 12 and an application leading edge radial surface contact area 14. Initial insertion leading edge radial surface contact area 12 had a length $l_2$ of 1.27 cm, and application leading edge radial surface contact area 14 had a length 4 of 0.635 cm. Radial surface contact areas 12 and 14 each had a maximum diameter $d_1$ and $d_2$, respectively, of 2.489 cm, which, after solution introduction, allowed for liquid pressure build-up against the interior surface of the porous tubular substrate 26 and formation of a second material (not shown in FIGS. 11 and 12) of relatively uniform thickness, as discussed below. Proximal to application leading edge radial surface contact area 14 was a 45° cone-shaped nose 16 having a length $l_5$ of 0.635 cm. The cone-shaped nose 16 allowed for easy insertion and alignment of torpedo applicator 10 into the porous tubular substrate 26. Located between radial surface contact areas 12 and 14 was a reservoir section 18 having a length $l_3$ of 2.54 cm and recessed from radial surface contact areas 12 and 14 by a depth of 0.318 cm, ie., walls 13 and 15 at the ends of reservoir section 18 were 2.54 cm apart and each measures 0.318 cm deep. Reservoir section 18 also had six liquid delivery passages 20, each 0.318 cm in diameter, that were drilled radially therethrough into a hollow central chamber of torpedo applicator 10. Liquid delivery passages 20 were used to deliver the second material solution to reservoir section 18, thereby contacting the interior surface of the porous tubular substrate 26 with the solution during the second material application process.

As shown in FIG. 12, the end of the cone-shaped nose 16 distal to initial insertion leading edge radial surface contact area 12 had an attachment comprising a liquid entry passage 22 drilled into the flat surface 24 of the cone-shaped nose 16. Liquid entry passage 22, having a depth of 3.81 cm, provided the entry to the hollow central chamber of torpedo applicator 10 and was in liquid communication with liquid delivery passages 20. Liquid entry passage 22 was machined and tapped to receive a 0.125 inch (0.318 cm) diameter national pipe thread ("NPT") threaded pipe connection (see FIG. 12).

Figure 13:
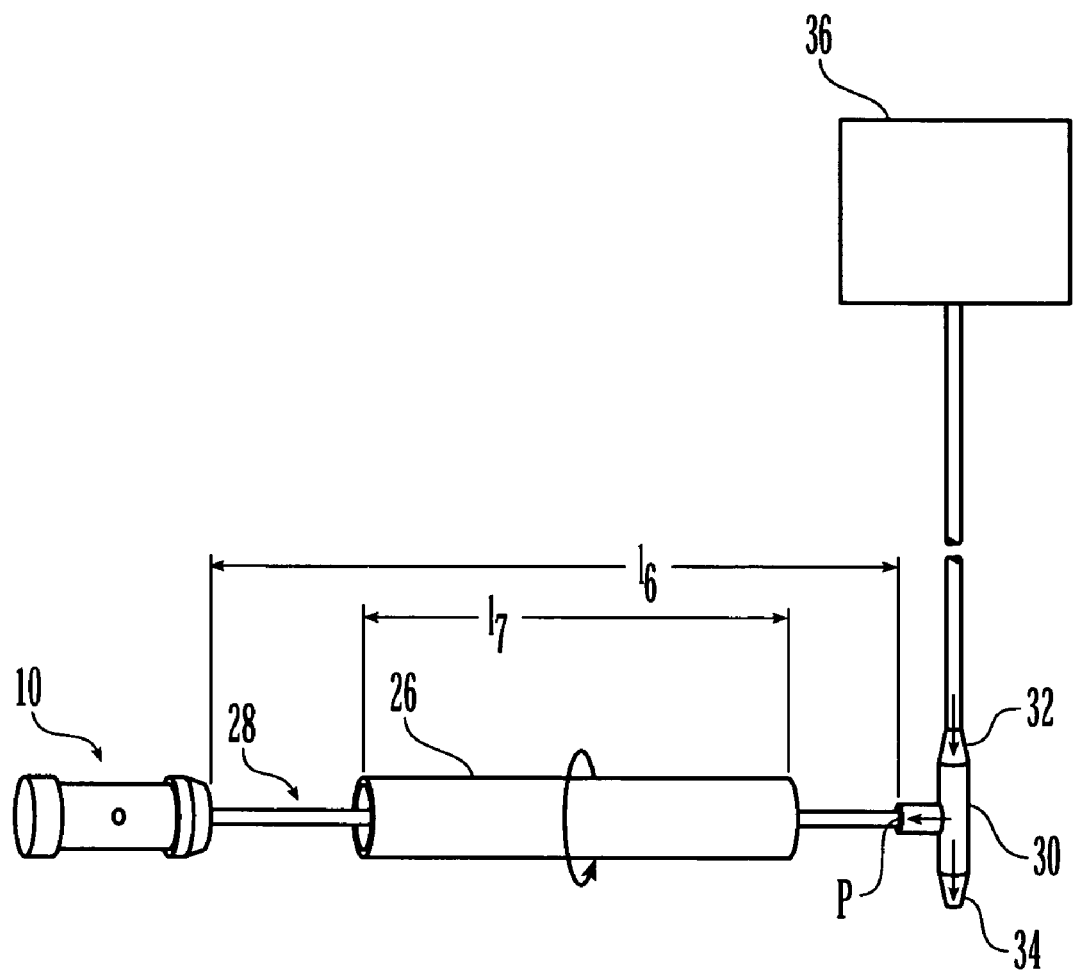
FIG. 13 illustrates the torpedo applicator of FIG. 11 connected to an exemplary liquid-delivery system.

Application Of A Second Material Solution Onto A Tubular First Material: The torpedo applicator 10 depicted in FIG. 11, also depicted in FIG. 13 as connected to the liquid-delivery system employed, used controlled liquid pressure, i.e., a gravity-driven pressure head, for application of the second material solution onto the interior surface of the porous tubular first material substrate. The flow rate of the solution was metered during application. The torpedo applicator 10 described above was threaded onto a seamless 304/304L stainless steel combination drive rod/supply tube 28 (see FIG. 13) having a length $l_6$ of about 120 cm, which was longer than the 91.4 cm length $l_7$ of the porous tubular substrate 26 to which second material solution was to be applied. The end of steel tube 28 distal to the torpedo applicator 10 was connected to a first outlet port P of a stainless steel ball valve 30 (depicted in FIG. 13 as a "t-shaped" ball valve). Ball valve 30 had an inlet port 32 and a second outlet port 34. Inlet port 32 and second outlet port 34 were each equipped with a barbed tube fitting to receive 1.588 cm inner diameter HDPE tubing. Inlet port 32 was in liquid communication with a 1 liter HDPE container 36, which contained the second material solution. Container 36 was mounted about 4.6 meters above the torpedo applicator 10. This liquid delivery apparatus was used to deliver Second Material Solution I, comprising PVDF as described in Example 1 and having a viscosity of about 500-10,000 cps, at a pressure of approximately 5 to 6 psi (34,500-41,300 Pa) to torpedo applicator 10.

The torpedo applicator 10 was carefully inserted into the bore at an end of a porous tube, obtained from Porex Corporation and formed from sintered PVDF, ie., substrate 26. The longitudinal-axis of the porous tubular substrate was oriented horizontally. The short length $l_1$ of torpedo applicator 10 relative to the length $l_7$ of porous tubular substrate 26 allowed for ease of entry of the torpedo applicator into the bore of the porous tubular substrate.

Then, via steel tube 28, the torpedo applicator was passed one time through the length of the bore of tubular substrate 26 until the torpedo applicator 10 emerged from the opposite end of tubular substrate 26 (as depicted in FIG. 11). As such, the interior surface of tubular substrate 26 was smoothened.

After pulling, via steel tube 28, torpedo applicator 10 back into the bore of tubular substrate 26 such that the entirety of radial surface contact area 14 was inside tubular substrate 26 while none of radial surface contact area 12 was inside tubular substrate 26, delivery of the second material solution, at a volumetric flow rate of about 70 mL/min, was initiated to the torpedo applicator. Via steel tube 28, torpedo applicator 10 was then pulled one time through the bore of the porous tubular substrate 26 with an adjustable speed puller at a rate of about 30.5 cm/min while tubular substrate 26 was simultaneously rotated about its longitudinal-axis at about 40 rpm by power-driven conveyor rollers.

After solution application to the interior of the tubular substrate was completed, i.e., the torpedo applicator emerged completely from the tube, the coated porous tube, held with its longitudinal-axis vertical, was slowly submersed (over about 30 seconds) into a drumlike-bath containing about 55 gallons (208 L) of tap water and allowed to sink until it touched the bottom of the bath. The tube remained in the bath for about 24 hours.

Following its removal from the bath, while holding the coated porous tube with its longitudinal-axis vertical, the tube was submersed into another bath containing a 5 wt. % solution of glycerin in tap water for 30 minutes. Following its removal from that bath, the tube was dried in air for 24 hours. The tube weighed 400 g before the Second Material Solution I was applied. After drying as described above, the weight had increased by 7 g.

The resulting composite porous tube had a first material porous substrate with an average pore size of about 80 µm and a second material porous membrane with an average pore size of about 0.1 µm.

Example 5

Preparation of Second Material Solution II

A second solution was prepared as follows.

To a one gallon HDPE milling jar/carboy, 470 grams NMP, 322.55 grams DMF and 102.5 grams DMAc were added to form a solution. The solution was then stirred gently with a glass rod to avoid air bubbles while, simultaneously, 105 grams of PVDF (KYNAR 2800) was slowly added. The lid was then secured onto the carboy with duct tape and the carboy was placed on a roller mill operating at 20 rpm until a solution appearing homogenous formed (after about 4-10 hours). The solution was then allowed to stand for about 16 hours at about 25° C. to remove air bubbles. Thereafter, the solution was examined for color (e.g., a yellowish appearance), air bubbles, and/or gel lumps of non-dissolved PVDF. Since none of these conditions was evident, the lid was secured onto the carboy with duct tape and the carboy was placed in a temperature-controlled room (maintained at about 25° C.) for further use.

Second Material Solution II was used in place of Second Material Solution I in preparing a composite porous tube by the procedure of Example 4 and provided similar satisfactory results.

Example 6

Preparation of Second Material Solution III

A third solution was prepared according to the procedure used for Solution A in Example 1 above except that 865 grams NMP were used in place of the 2,500 grams DMAc and 30 grams LiCl and 105 grams of PVDF (KYNAR 2800) were used. Second Material Solution III was examined for color (e.g., a yellowish appearance), air bubbles, and/or gel lumps of non-dissolved PVDF. Since none of these conditions was evident, the lid was secured onto the carboy with duct tape and the carboy was placed in a temperature-controlled room (maintained at about 25° C.) for further use.

Second Material Solution III was used in place of Second Material Solution I in preparing a composite porous tube by the procedure of Example 4 and provided similar satisfactory results.

Example 7

Preparation of Second Material Solution IV

A fourth solution was prepared according to the procedure used for Solution A in Example 1 above except that 216 grams NMP and 648 grams DMAc were used in place of the 2,500 grams DMAc and 30 grams LiCl and 105 grams of PVDF (KYNAR 2800) were used. Second Material Solution IV was examined for color (e.g., a yellowish appearance), air bubbles, and/or gel lumps of non-dissolved PVDF. Since none of these conditions was evident, the lid was secured onto the carboy with duct tape and the carboy was placed in a temperature-controlled room (maintained at about 25° C.) for further use.

Second Material Solution IV was used in place of Second Material Solution I in preparing a composite porous tube by the procedure of Example 4 and provided similar satisfactory results.

Example 8

Applying a Second Material onto a Vertically-Oriented Tubular First Material with a Torpedo Applicator The application process is carried out in a procedure similar to that described in Example 4 except that the longitudinal-axis of the porous tubular first material substrate is oriented vertically rather than horizontally. The torpedo applicator is inserted into the upper end of the bore of the tubular substrate and passes through the length of the tubular substrate until the torpedo applicator emerges from the lower end of the porous tubular substrate. After delivery of the second material solution to the torpedo applicator is initiated, the applicator is pulled slowly upward through the bore of the porous tubular substrate. Throughout the upward pull, the pressure of the second material solution within the hollow central chamber of the torpedo applicator is adjusted as required so as to remain approximately constant.

Example 9

Applying a Second Material onto a Horizontally-Oriented Tubular First Material Example 9 describes a non-limiting embodiment of the present invention where a second material solution was applied to a porous tubular substrate comprising a first material. Each step described below was performed at a temperature of about 25° C.

A porous tube, obtained from Porex Corporation and formed from sintered PVDF, having a length of 91.4 cm, an inner diameter of 2.54 cm, and an outer diameter of 3.81 cm, was plugged at one end. The tubular substrate was rotated such that its longitudinal-axis was oriented vertically with the plugged end faced downward. From the top, about 80 g of Second Material Solution I, comprising PVDF and described in Example 1, was added to the bore of the tubular substrate until the tubular substrate was filled about half-way to the top. The top opening of the porous tubular substrate was then plugged.

The resultant plugged tubular substrate was placed into a cylindrical solvent-containment fixture having a cylindrical hollow center with an inner diameter of about 5.08 cm, designed to hold the tubular substrate snugly after inserting o-ring-like gaskets between the interior surface of the fixture and the outer surface of the tubular substrate. The cylindrical fixture was then placed on a horizontal roller mixer and rotated at about 40 rpm for about 3 minutes to allow the second material solution to spread on the interior surface of the porous tubular substrate. Rotation was stopped and the end plugs were removed to allow residual second material solution to drain from the tube. A steel ball 2.50 cm in diameter and weighing 65 g was inserted into one end of the tube. The tube was then raised slightly which allowed the ball to "roll" down within the bore of the tube, to push out residual second material solution, and to provide an even finish.

While holding the coated porous tube with its longitudinal-axis vertical, the tube was slowly submersed (over about 30 seconds) into a drumlike-bath containing about 55 gallons (208 L) of tap water and allowed to sink until it touched the bottom of the bath. The tube remained in the bath for about 24 hours.

Following its removal from the bath, while holding the coated porous tube with its longitudinal-axis vertical, the tube was submersed into another bath containing a 5 wt. % solution of glycerin in tap water for 30 minutes. Following its removal from that bath, the tube was dried in air for 24 hours. The tube weighed 400 g before the Second Material Solution I was applied. After drying as described above, the weight had increased by 10 g.

The resulting composite porous tube had a first material porous substrate with an average pore size of about 80 µm and a second material porous membrane with an average pore size of about 0.1 µm.

Example 10

Applying a Second Material onto a Horizontally-Oriented Tubular First Material The application process is carried out in a procedure similar to that described in Example 9 except that the steel ball is replaced by a glass rod (length 107 cm, diameter 2.413 cm) inserted into the bore of the coated porous substrate with its longitudinal-axis parallel to the longitudinal-axis of the tube. The glass rod is allowed to "slide" down within the bore of the tube, to push out residual second material solution, and to provide an even finish.

The present invention is not to be limited in scope by the specific embodiments disclosed in the examples which are intended as illustrations of a few aspects of the invention and any embodiments that are functionally equivalent are within the scope of this invention. Indeed, various modifications of the present invention in addition to those shown and described herein will become apparent to those skilled in the art and are intended to fall within the scope of the appended claims.

A number of references have been cited, the entire disclosures of which are incorporated herein by reference.

What is claimed is:

1. A composite porous material comprising:
    a sintered porous first polymeric material having a first average pore size;
    a precipitated porous second polymeric material having a second average pore size smaller than the first average pore size;
   wherein at least a portion of the second polymeric material is fused to the sintered, porous first polymeric material by at least one direct physical bond, and the second polymeric material is in at least some of the pores of the first polymeric material.

2. The composite porous material of claim 1, wherein the first polymeric material is a sheet, tube, or other molded shape.

3. The composite porous material of claim 1, wherein the first polymeric material has a thickness greater than about 250 µm.

4. The composite porous material of claim 3, wherein the second polymeric material has a thickness less than about 125 µm.

5. The composite porous material of claim 1, wherein the first polymeric material comprises sintered underwater pelletized particles.

6. The composite porous material of claim 1, wherein the first polymeric material comprises sintered cryogenically ground particles.

7. The composite material of claim 1, wherein the second polymeric material is in greater than about 1% of the pores of the first polymeric material.

8. The composite material of claim 1, wherein the second polymeric material is in greater than about 25% of the pores of the first polymeric material.

9. The composite material of claim 1, wherein the second polymeric material is in greater than about 90% of the pores of the first polymeric material.

10. The composite porous material of claim 1, wherein the first average pore size ranges from about 1 µm to about 200µm.

11. The composite porous material of claim 1, wherein the first average pore size ranges from about 25 µm to about 200 µm.

12. The composite porous material of claim 1, wherein the first average pore size ranges from about 5 µm to about 100 µm.

13. The composite porous material of claim 1, wherein the first average pore size ranges from about 10 µm to about 50 µm.

14. The composite porous material of claim 1, wherein the second average pore size ranges from about 0.2 µm to about 10 µm.

15. The composite porous material of claim 1, wherein the second average pore size ranges from about 0.01 µm to about 5 µm.

16. The composite porous material of claim 1, wherein the second average pore size ranges from about 0.1 µm to about 10 µm.

17. The composite porous material of claim 1, wherein the second average pore size ranges from about 0.1 µm to about 2 µm.

18. The composite material of claim 1, wherein the second polymeric material has a thickness less than or equal to the first polymeric material.

19. The composite material of claim 1, wherein at least a portion of the second polymeric material is fused to the first polymeric material by a plurality of direct physical bonds.

20. The composite material of claim 1, wherein the first polymeric material and the second polymeric material each comprise the same polymer or the first polymeric material and the second polymeric material each comprise a polymer from the same polymer family.

21. The composite porous material of claim 1, wherein the first polymeric material and the second polymeric material are independently selected from the group consisting of fluoropolymers, polyamides, polyethylenes, polypropylenes, polyesters, polyacrylonitriles, polyether imides, polyether ketones, polysulfones, polyethersulfones, polyvinyl chlorides, copolymers of vinyl chloride and acrylonitrile, or any combination thereof.

22. The composite porous material of claim 1, wherein the first polymeric and the second polymeric materials comprise fluoropolymers.

23. The composite porous material of claim 22, wherein the first polymeric and the second polymeric materials comprise polyvinylidene fluoride.

24. The composite porous material of claim 1, wherein at least a portion of the second polymeric material is fused to pore walls of the first polymeric material.

* * * * *

UNITED STATES PATENT AND TRADEMARK OFFICE
CERTIFICATE OF CORRECTION

| | | |
|---|---|---|
| PATENT NO. | : 7,674,517 B2 | Page 1 of 1 |
| APPLICATION NO. | : 10/982392 | |
| DATED | : March 9, 2010 | |
| INVENTOR(S) | : Thomas Henry Ramsey et al. | |

It is certified that error appears in the above-identified patent and that said Letters Patent is hereby corrected as shown below:

Column 29, Claim 14, Line 38. Please change "0.2 µm" to --0.2 nm--.

Signed and Sealed this
First Day of March, 2011

David J. Kappos
*Director of the United States Patent and Trademark Office*